United States Patent
Alhussein et al.

(10) Patent No.: US 12,039,062 B2
(45) Date of Patent: Jul. 16, 2024

(54) METHODS, SYSTEMS AND COMPUTER PROGRAM PRODUCTS FOR PROTECTING A DEEP REINFORCEMENT LEARNING AGENT

(71) Applicant: HUAWEI TECHNOLOGIES CO., LTD., Shenzhen (CN)

(72) Inventors: Omar Ahmad Mohammad Alhussein, Ottawa (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 17/546,768

(22) Filed: Dec. 9, 2021

(65) Prior Publication Data
US 2023/0185932 A1 Jun. 15, 2023

(51) Int. Cl.
*G06F 21/62* (2013.01)
*G06N 3/044* (2023.01)

(52) U.S. Cl.
CPC .............. *G06F 21/62* (2013.01); *G06N 3/044* (2023.01)

(58) Field of Classification Search
CPC .............. G06F 21/62–629; G06N 3/044–0442
See application file for complete search history.

(56) References Cited

U.S. PATENT DOCUMENTS

| | | | |
|---|---|---|---|
| 2018/0373982 A1 | 12/2018 | Salakhutdinov et al. | |
| 2021/0141355 A1 | 5/2021 | Duan et al. | |
| 2022/0286272 A1* | 9/2022 | Wang | G06F 21/602 |
| 2023/0144680 A1* | 5/2023 | Moon | G06F 21/33 |
| | | | 713/190 |

FOREIGN PATENT DOCUMENTS

| | | |
|---|---|---|
| CN | 110945542 A | 3/2020 |
| CN | 111343095 A | 6/2020 |
| WO | 2021220241 A1 | 11/2021 |
| WO | WO-2022243234 A1 * | 11/2022 |

OTHER PUBLICATIONS

Pyone, April, Maung Maung, and Hitoshi Kiya. "Training DNN model with secret key for model protection." 2020 IEEE 9th Global Conference on Consumer Electronics (GCCE). IEEE, 2020. (Year: 2020).*

Chen K, Guo S, Zhang T, Xie X, Liu Y. Stealing deep reinforcement learning models for fun and profit. InProceedings of the 2021 ACM Asia Conference on Computer and Communications Security May 24, 2021 (pp. 307-319). (Year: 2021).*

Behzadan et al., "Sequential Triggers for Watermarking of Deep Reinforcement Learning Policies," arXiv:1906.01126v1 [cs.LG], Jun. 3, 2019, 4 pages.

(Continued)

*Primary Examiner* — Madhuri R Herzog

(57) ABSTRACT

There are provided a method, system and computer program product for preventing unauthorized use of a deep reinforcement learning agent. The DRL agents are trained to behave as expected only when they observe the one or more required secret operational keys. In some embodiments, the DRL agents are further trained to operate at a diminished capacity when the one or more required secret operational keys are unused.

18 Claims, 15 Drawing Sheets

(56) References Cited

OTHER PUBLICATIONS

Chen et al., "Temporal Watermarks for Deep Reinforcement Learning Models," Proceedings of the 20th International Conference on Autonomous Agents and Multiagent Systems (AAMAS 2021), May 3-7, 2021, p. 314-322.

W. Liang, W. Huang, J. Long, K. Zhang, K.-C. Li and D. Zhang, "Deep Reinforcement Learning for Resource Protection and Real-Time Detection in IoT Environment," in IEEE Internet of Things Journal, vol. 7, No. 7, pp. 6392-6401, Jul. 2020, doi: 10.1109/JIOT.2020.2974281.

* cited by examiner

METHODS, SYSTEMS AND COMPUTER PROGRAM PRODUCTS FOR PROTECTING A DEEP REINFORCEMENT LEARNING AGENT

CROSS-REFERENCE TO RELATED APPLICATIONS

This is the first application filed for the present invention.

FIELD

The present disclosure pertains to the field of digital watermarking and in particular to methods, systems and computer program products for preventing unauthorized use of a deep reinforcement learning agent.

BACKGROUND

Machine learning is a part of artificial intelligence (AI) and provides systems and applications with the ability to learn and automatically improve through experience and by the use of data. Machine learning can be classified into three main types: supervised learning, unsupervised learning and reinforcement learning (RL). In supervised learning and unsupervised learning, a neural network is trained based on existing data sets. In reinforced learning, there exists an intelligent agent which acts and directs its activities towards achieving goals and learns by interacting with an environment to achieve a specific set of goals. The intelligent agent or agent can be implemented or expressed as a table or neural network. RL attempts to solve a control problem that is different from problems that supervised learning and unsupervised learning attempt to solve.

The RL agent's action selection is modeled as a policy. In order to generate a deep RL policy, an enormous amount of resources and computations are required and therefore a well-trained RL agent often becomes a target for illegal reproduction, unlicensed use and distribution. Accordingly, there have been a few attempts to verify the ownership of a (deep) RL agent and protect it from illegal copying (e.g. theft) or unlicensed use, distribution or redistribution by adversary entities (e.g. thief).

A popular way of addressing the above issues is watermarking (e.g. watermarking of the deep RL policies). However, a watermarking technique for RL models or policies, for example, may not be pragmatic or realistic because it is possible that the stolen products (e.g. model, policy) are used in a closed environment that is not accessible by the owner of the RL agent (e.g. original owner). For example, there may be an RL agent which works in the thief's proprietary warehouse or server. In such cases, even if the RL agent includes an embedded watermark, the owner of the RL agent cannot detect or interact with the stolen or unauthorized product without physically obtaining the stolen RL agent.

Therefore there is a need for methods, systems and computer program products for preventing unauthorized use of a deep reinforcement learning agent, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide methods, systems and computer program products for preventing unauthorized use of a deep reinforcement learning agent. In accordance with embodiments of the present disclosure, there is provided a method for preventing unauthorized use of a deep reinforcement learning (DRL) agent. The method includes training the DRL agent to operate based on a desired policy when a secret operational key is provided to the DRL agent. The secret operational key is exclusively available to an authorized entity. The method further includes training the DRL agent to operate based on an undesired policy when the secret operational key is missing. The method further includes, when authorized use of the DRL agent is solely based on detection of the secret operational key, operating the DRL agent based on the desired policy upon detection of the secret operational key and operating the DRL agent based on the undesired policy upon non-detection of the secret operational key.

In some embodiments, the method for preventing unauthorized use of a DRL agent further includes, when a second secret operational key is provided to the DRL agent, training the DRL agent to operate based on a second desired policy. The second secret operational key is exclusively available to the authorized entity or another authorized entity. The method further includes, upon detection of the second secret operational key, operating the DRL agent based on the second desired policy. The method further includes, upon non-detection of the second secret operational key, operating the DRL agent based on the undesired policy when authorized use of the DRL agent is solely based on detection of the second secret operational key.

In some embodiments, training the DRL agent based on the desired policy further includes training the DRL agent to operate based on the desired policy when both the secret operational key and a second secret operational key are provided to the DRL agent. The second secret operational key is exclusively available to the authorized entity. Training the DRL agent to operate based on the undesired policy further comprises training the DRL agent to operate based on the undesired policy when one or more of the secret operational key and the second secret operational key are missing. In such embodiments, the method for preventing unauthorized use of a DRL agent further includes upon detection of the secret operational key and the second secret operational key, operating the DRL agent based on the desired policy when authorized use of the DRL agent is solely based on detection of the secret operational key and the second secret operational key. Moreover, the method further includes, upon non-detection of one or more of the secret operational key and the second secret operational key, operating the DRL agent based on the undesired policy.

In some embodiments, the method for preventing unauthorized use of a DRL agent further includes appending a new state space to an original state space. The union of the new state space and the original state space representing a set of states for the DRL agent. The method further includes selecting one or more elements from the new state space and determining the secret operational key based on the selected one or more elements. In some cases, the secret operational key is designated as a secret function of a state or a combination of states in the original state space, where the secret function is exclusively known to an owner of the DRL agent In some embodiments, the secret operational key is a temporal sequence derived from a state transition space for a trajectory for a behaviour of the DRL agent over one or more discrete time steps. The secret operational key may be provided through a physical object or by a function embedded in a system operatively associated with the DRL agent. An operational level of the DRL agent may be dependent upon which secret operational key is provided to the DRL agent.

In accordance with embodiments of the present disclosure, there is provided another method for preventing unauthorized use of a deep reinforcement learning (DRL) agent. The other method includes receiving the first DRL agent. The first DRL agent is pre-trained to operate based on a desired policy, and has an input-output dimension. The other method further includes creating a second DRL agent having the input-output dimension of the first DRL agent. The second DRL agent is configured to operate based on a less-desired policy. The other method further includes creating a DRL agent module including the first DRL agent, the second DRL agent and an agent determining module. The agent determining module is configured to activate the first DRL agent and deactivate the second DRL agent upon receipt of a secret operational key. The agent determining module is further configured to activate the second DRL agent and deactivate the first DRL agent upon non-receipt of the secret operational key.

In some embodiments, the secret operational key is a temporal sequence derived from a state space representing a set of states associated with the first DRL agent and the second DRL agent.

In some embodiments, the agent determining module is configured as a recurrent neural network or a long short term memory (LSTM) module. In some embodiments, the agent determining module is configured as a deterministic key filter. The agent determining module may output to an inverter configured to activate one of the first DRL agent and the second DRL agent.

In some embodiments where the agent determining module is configured as a deterministic key filter, the other method for preventing unauthorized use of a DRL agent further includes, upon detection of the secret operational key, fixing an output value of the deterministic key filter until a length associated with the secret operational key passes.

In accordance with embodiments of the present invention, there are provided systems for preventing unauthorized use of a deep reinforcement learning (DRL) agent. Each system comprises a DRL agent training device and a DRL agent execution device configured to perform actions corresponding to any or all of the steps of the methods and features described above.

In accordance with embodiments of the present invention, there are provided computer program products for preventing unauthorized use of a deep reinforcement learning (DRL) agent. Each computer program product has a computer program stored thereon, containing computer-readable program instructions that, when executed by a processing unit in a controller, causes the controller to perform actions corresponding to any or all of the steps of the methods and features described above.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

DETAILED DESCRIPTION

Figure 1:
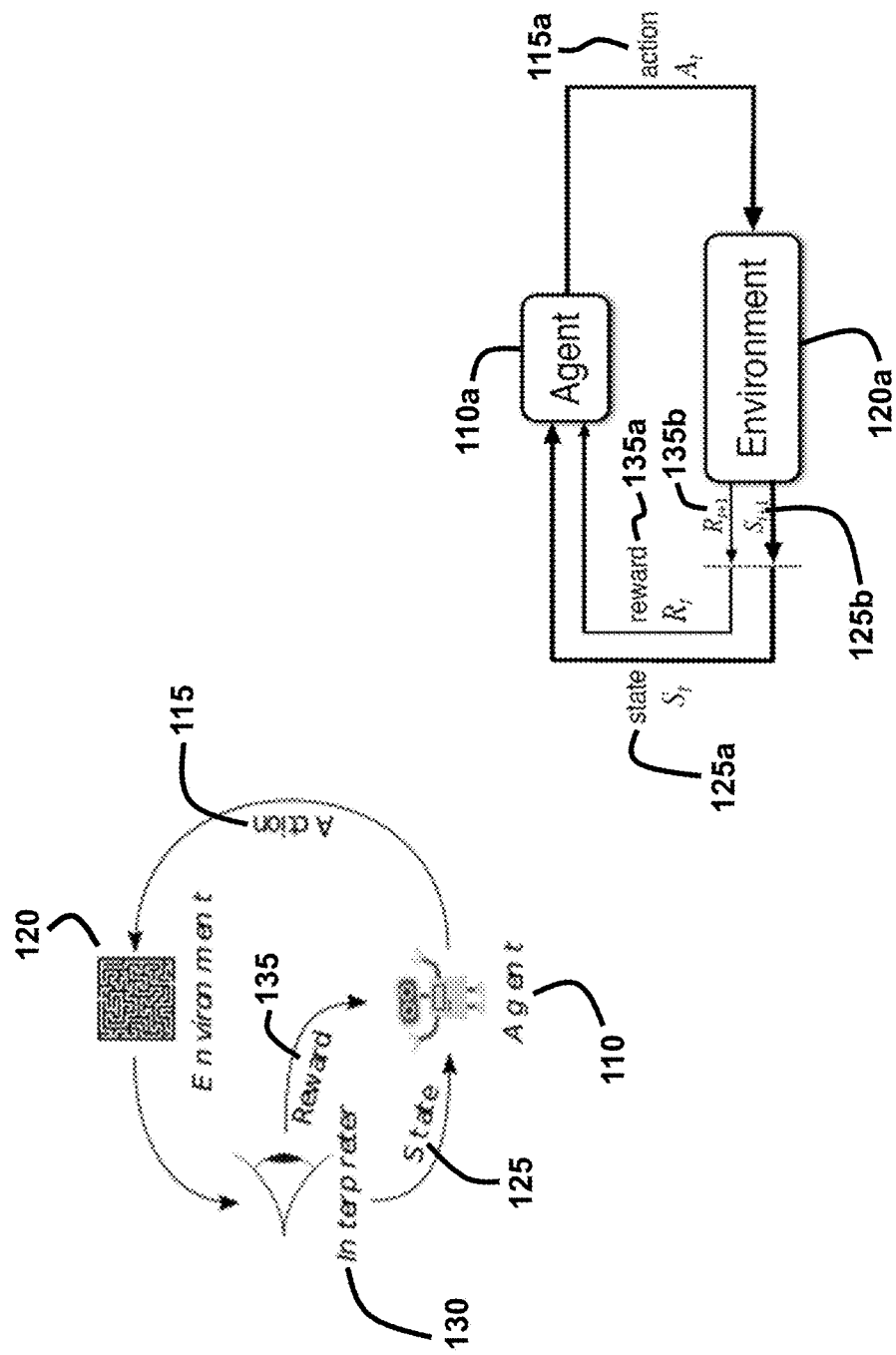
FIG. 1 illustrates an interaction between an agent and environment in a reinforcement learning (RL) scenario.

The present disclosure provides methods, systems and computer program products for preventing unauthorized use of a deep reinforcement learning (DRL) agent such as illegal reproduction or unlicensed use or distribution by adversarial entities (e.g. thief). According to embodiments, one or more secret operational keys are utilized to operate and protect DRL agents. Put another way, the use of the one or more secret operational keys can prevent unauthorized activities as an adversarial party cannot properly operate the stolen DRL agent without knowing the one or more secret operational keys. Therefore, in various embodiments, the DRL agents are trained to behave as expected only when they observe the one or more required secret operational keys. In some embodiments, the DRL agents are further trained to operate at a diminished capacity when the one or more required secret operational keys are unused.

In the present disclosure, there are provided methods for preventing unauthorized use of a DRL agent. A method is directed to the training of protected DRL agents, wherein there are multiple ways of defining the secret operational keys that are utilized to operate and protect DRL agents. Another method is directed towards a modular structure or methodology to protect pre-trained RL agents by wrapping the original desired policy (e.g. the nominal policy) with a less-desired or undesired policy and switching between the two policies based on whether the one or more (required) secret operational keys are used or unused. It should be noted that 'less-desired' and similar expressions (e.g. less-desirably) can be interchangeably used with 'undesired' and corresponding expressions (e.g. undesirably) in the present disclosure. In various embodiments, the switching mechanism (e.g. an encompassing protected policy) can be established or enabled through a recurrent neural network (RNN), which may be trained through supervised learning mechanism. In some embodiments, the switching mechanism (e.g. an encompassing protected policy) can be established or enabled using a key-detecting filter with a locking function. According to some embodiments, the agent training and the operational key embedding can be performed independently using a modular structure or methodology. In various embodiments, the modular structure or methodology can enable arbitrary long state transitions being used as secret operational keys.

According to embodiments, there is provided an original DRL agent that is trained to perform in a desirable way and another DRL agent that is untrained or is trained to behave in a less desirable or undesirable way. The two DRL agents have similar input-output dimensions or ranges. The original DRL agent may be pre-trained with a (nominal) desired policy. In some embodiments, the pre-trained DRL agent may be received by the system. With these two DRL agents, a long short-term memory (LSTM) is trained or a deterministic key filter is used to learn how to recognize state transitions. The original policy, hidden policy (i.e. undesired policy) associated with the original DRL agent, and the LSTM (or the deterministic key filter) are combined as one encompassing protected policy. To protect the desired DRL agent from unauthorized activities, the protected policy switches between the original policy (desired policy) and the hidden policy (undesired policy) based on the trained LSTM or the deterministic key filter.

In various embodiments of the present disclosure, a secret operational key includes or can be obtained based on one or more of the following elements: a temporal sequence, a numerical sequence (numerical code), an alphabetical sequence (alphabetical code), an alphanumerical sequence (alphanumerical code), a character sequence (e.g. a sequence formed from special characters) or other type of sequence, function, arbitrary long state transition, analog or digital data indicative of a state space or environment, and a combination of two or more thereof. In some embodiments, element(s) associated with the secret operational key is encoded. Accordingly, in some embodiments, a secret operational key may be encoded or not encoded. It will be readily understood that if multiple secret operational keys are required, each secret operational key can be configured independently or dependently on one or more of the other secret operational key of the multiple secret operational keys.

FIG. 1 illustrates an interaction between an agent and an environment in a reinforcement learning (RL) scenario. Referring to FIG. 1, the agent 110 is a decision maker and learner, and the environment 120 includes the features that are outside of the agent 110. The agent 110 interacts with the environment 120 in discrete time steps (decision epochs). The agent 110 selects an action in the environment 120. The environment 120 responds to these actions, and presents a new state (e.g. a new situation) to the agent 110. At each time step, the agent 110 receives a current state 125 and a reward signal 135 through an interpreter 130. Throughout the interaction 115, the agent 110 seeks to learn the best behavior or policy to maximize the reward signal 135, for example maximizing the reward signal over time.

Specifically at each discrete time t, the agent $110a$ observes the state $S_t$ $125a$ and reward $R_t$ $135a$. The state $S_t$ $125a$ is indicative of the environment $120a$ related to the goals of the agent $110a$. The agent $110a$ then exerts an action $A_t$ $115a$ by interacting with the environment $120a$. Through the interaction with the agent $110a$, the environment $120a$ changes, and therefore the new state $S_{t+1}$ $125a$ and the reward $R_{t+1}$ $135b$ are obtained.

Figure 2:
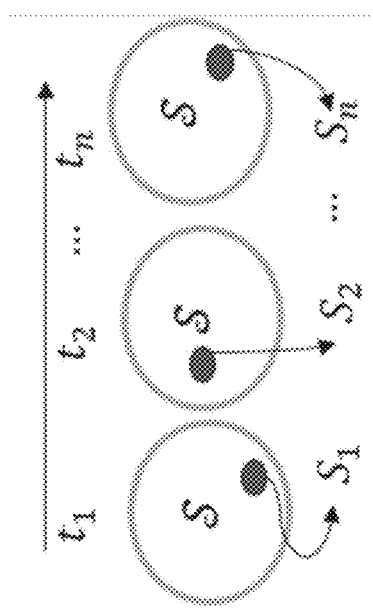
FIG. 2 illustrates a progression of states associated with a deep RL (DRL) agent's behaviors.

The Markov decision process (MDP) is a formal method to represent the agent-environment interaction. The agent-environment interaction can be described as a tuple $<\mathcal{S}, \mathcal{A}, \mathbb{R}>$. For the tuple $<\mathcal{S}, \mathcal{A}, \mathbb{R}>$, $\mathcal{S}$ represents the state space, which includes the possible states of the environment, $\mathcal{A}$ represents the set of possible actions, and $\mathbb{R}$ represents the reward function. One sample from the agent behavior is called a trajectory (e.g. $S_0, A_0, R_1, S_1, A_1, R_2, S_2, \ldots$). The progression of states associated with the behaviour of the DRL agent is illustrated in FIG. 2.

Attempts to protect the DRL agents from unauthorized activities have been discussed, for example in "Sequential Triggers for Watermarking of Deep Reinforcement Learning Policies, arXiv:1906.01126v1 [cs], June 2019" by V. Behzdan and W. Hsu, hereinafter referred to as R1, and "Temporal Watermarks for Deep Reinforcement Learning Models, Proceedings of the 20th International Conference on Autonomous Agents and Multi Agent Systems, 2021" by K. Chen et al., hereinafter referred to as R2. There is proposed an embedding of a watermarking schemes in the DRL agent for protection of the DRL policies or models from unauthorized activities (e.g. illegal replication, unlicensed use or distribution). Generally speaking, watermarking is a process where the owner embeds a secret signature or pattern into a product to verify the ownership and detect any malicious activities such as theft (e.g. illegal copying) or unlicensed use. In both R1 and R2, the watermark resembles a secret behavior or a hidden policy that can be triggered by the original owner.

In R1, it is proposed to train the DRL agent by using a separate MDP $<\mathcal{S}', \mathcal{A}', \mathbb{R}'>$ in addition to the original MDP $<\mathcal{S}, \mathcal{A}, \mathbb{R}>$. In the process, the owner can train the agent to learn a secret behavior on a separate hidden policy based on the added MDP $<\mathcal{S}', \mathcal{A}', \mathbb{R}'>$.

R2 proposed training the agent on the original MDP. However, it is also provided that the agent can be trained on secret state transitions (i.e. a temporal sequence) (e.g., $S_1$, $S_2$, ..., $S_5$) so that the agent can invoke the secret behavior (which can be defined as the watermark).

In both R1 and R2, the embedding of a watermark is used to protect the DRL models or policies from unauthorized activities (e.g. illegal reproduction, unlicensed use or distribution). Specifically, in order to detect unauthorized activities (e.g. theft), the original owner of the DRL agent triggers a special subset of states or sequence of states so that the DRL agent can invoke the watermark (e.g. the watermark is envisioned as a pre-trained secret behavior). However, this watermarking approach may not be effective especially when the adversarial entity (e.g. thief) uses the stolen DRL agent in a closed environment that is not accessible by the original owner. As such, the original owner cannot invoke the watermark due to inaccessibility. Even if the stolen DRL agent is operating in an open environment, the original owner would not be able to invoke the watermark when there is no direct access to that environment states or a direct means for affecting the environment states perceived by the DRL agent.

The present disclosure provides an out-of-the-box approach and method. According to embodiments, a DRL agent can be protected from illegal copying and other unauthorized activities (e.g. unlicensed usage) by utilizing one or more secret operational keys associated with the DRL agent. The DRL agent can be trained to operate as expected (e.g. optimal performance) only when the DRL agent is provided with one or more required secret operational keys. In some embodiments, only one secret operational key is required for the optimal performance or behavior. In some embodiments, multiple secret operational keys are required for the optimal performance or behavior. In this context the secret operational keys are known only to the owner(s) of the DRL agent or to an authorized user of the DRL agent.

The DRL agents are also trained to operate poorly or behave undesirably (e.g. poor performance or impaired behavior) if the required secret operational keys are not provided. In various embodiments, the DRL agents would not operate or deliver desirable behaviors even if they miss only one of the required secret operational keys.

According to embodiments, a key-operated DRL agent adds a layer of protection and therefore the DRL agent is effectively protected even when the agent is stolen, as the agent would not be able to operate as expected without the secret operational keys that are exclusively available to the owner(s) or authorized users of the DRL agent.

The present disclosure provides multiple ways of utilizing the secret operational keys for protection of the DRL agent against illegal copying or other unauthorized activities.

According to embodiments, a DRL agent is trained to have two policies (or objectives). One policy would be considered as a nominal desired policy and the other policy would be considered as an undesired or less-desired policy. The DRL agent operates nominally and desirably (i.e. the agent uses the nominal desired policy) only when the agent is provided with one or more (required) secret operational keys. The provision of the secret operational key may be intermittent, at required times, or continuous, or in another desired sequence for secret operation key provision. The DRL agent is trained to operate based on the undesired policy without the (required) one or more secret operational keys. In some embodiments, the DRL agent is not trained at all when the one or more secret operational keys are not provided.

In some embodiments, a DRL agent is trained to have more than two policies (or objectives). In such cases, one policy would be considered as a nominal desired policy and the remaining policies would be considered as undesired policies. The operation of the DRL agent is differentiated depending on which policy or objective is held or utilized by the agent. Put another way, the operational level of the DRL agent (e.g. performance level, effectiveness of the DRL agent operation) may be dependent upon the secret operational keys provided to the DRL agent. The DRL agent is trained to operate nominally or desirably based on the nominal desired policy only when it is (e.g. intermittently or continuously) provided with all of the secret operational keys. In other cases (i.e. when the DRL agent misses some or all of the secret operational keys), the DRL agent operates based on one of the undesired policies. In some embodiments, the operation level of the DRL agent may be dependent upon the number of secret operational keys that the DRL agent misses. In various embodiments, the less secret operational keys the DRL agent has, the poorer performance or the less desirable behaviors (or more undesirable behaviors) the DRL agent would deliver.

In the present disclosure, various embodiments are described based on DRL agents utilizing one secret operational key. However, a person skilled in the art would readily understand that one or more secret operational keys can be associated with each DRL agent and the operation level of the DRL agent (e.g. performance level, effectiveness of the DRL agent operation) may vary depending on the secret operational keys provided to the DRL agent. This is because the policy associated with the DRL agent (i.e. whether the DRL operates based on a nominal (desired) policy or one of a set of undesirable policies) is determined based on the secret operational keys provided to the DRL agent. For example, the DRL agent may be trained to operate based on a first desired policy when a first secret operational key is provided, and trained to operate based on a second desired policy when a second secret operational key is provided. The DRL agent may be also trained to operate based on an undesired policy when both of the secret operational keys are missing. In this case, the DRL agent will operate nominally (desirably) upon detection of one of the first and second secret operational keys. However, as each of the first desired policy and the second desired policy would direct the DRL agent (e.g. determine the operation of the DRL agent) according to its own rules and principles, the operational level of the DRL agent can vary depending on which of the first and second secret operational keys is provided to the DRL agent. If both of the first and second secret operational keys are not provided to the DRL agent and therefore both secret operational keys are not detected, the DRL agent will operate based on the undesired policy as it is trained. In some embodiments, the operation level of the DRL agent is determined merely based on the number of the secret operational keys provided to the DRL agent. For example, the DRL agent may be trained to operate based on a desired policy only when all of the required secret operational keys (e.g. requiring both of first and second secret operational keys), and trained to operate based on an undesired policy if any of the required secret operational keys is missing (e.g. missing one of the first and second secret operational keys). In this case, the DRL agent will operate based on a desired policy upon detection of all of the required secret operational keys (e.g. both of first and second secret operational keys detected), and operate based on an undesired policy upon non-detection of any of the required secret operational keys (e.g. one or both of first and second secret operational keys are not detected). In another example, the DRL agent may be trained to operate based on the most desired policy (optimal policy) when both of the first and second secret operational keys are provided, trained to operate based on an undesired policy when both of the first and second secret operational keys are missing, and trained to operate based on a moderate policy (e.g. less desirable than the optimal policy but more desirable than the undesired policy) when only one of the first and second secret operational keys are provided.

According to embodiments, there are several ways of defining or expressing a secret operational key. In some embodiments, the secret operational key can be defined using a static or temporal key derived from a new disjoint state space which has no common element with the original state space. In some embodiments, the secret operational key can be defined using a static or temporal key derived from the original state space. In some embodiments, the secret operational key can be derived as the output of a secret deterministic or probabilistic function from the original state space. The secret deterministic or probabilistic function is only known to an authorized user (e.g. owner or designer of the DRL agent).

Figure 3:
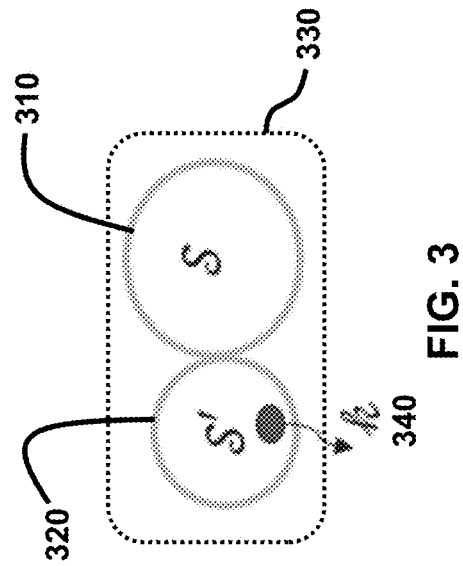
FIG. 3 illustrates a secret operational key derived from a disjoint state space, in accordance with embodiments of the present disclosure.

FIG. 3 illustrates a secret operational key derived from a new disjoint state space, in accordance with embodiments of the present disclosure. Referring to FIG. 3, there are provided the original state space $S$ 310 and the new state space $S'$ 320. Each of the original state space $S$ 310 and the new state space $S'$ 320 represents a set of agent states, which includes some or all possible states for the DRL agent.

In order to define a secret operational key, the new state space $S'$ 320 is appended to the original state space $S$ 310 such that intersection of the original state space $S$ 310 and the new state space $S'$ 320 is an empty set (i.e. original state space $S$ 310 ∩ new state space $S'$ 320={ }, the original state space $S$ 310 and the new state space $S'$ 320 are disjoint sets). Therefore, the protected DRL agent has a new expanded state space 330 that is the union of the original state space $S$ 310 and the new state space $S'$ 320 (i.e. original state space $S$ 310 ∪ new state space $S'$ 320).

According to embodiments, one or more elements are designated or selected from the new state space $S'$ 320. Then, the selected one or more elements are designated as a secret operational key $k$ 340. In other words, the secret operational key $k$ 340 is obtained or determined based on the one or more elements selected from the new state space $S'$ 320.

Once the secret operational key $k$ 340 is obtained or determined, the DRL agent can be trained to maximize the reward function $F_1(\cdot)$ or behave to achieve the goal if the secret operational key $k$ 340 is included in the input. The DRL agent is trained to maximize another function $F_2(\cdot)$ or operated based on an undesired policy if the secret operational key $k$ 340 is not included in the input. The function $F_2(\cdot)$ is substantially equivalent to an undesired function or behavior. In light of the above, the DRL agent is trained based on the following composite reward function $\mathbb{R}$.

$$\mathbb{R} = \begin{cases} F_1(x, k), x \in S, k \in S' \\ F_2(x, y), x \in S, y \neq k \in S' \end{cases}$$

Figure 4B:
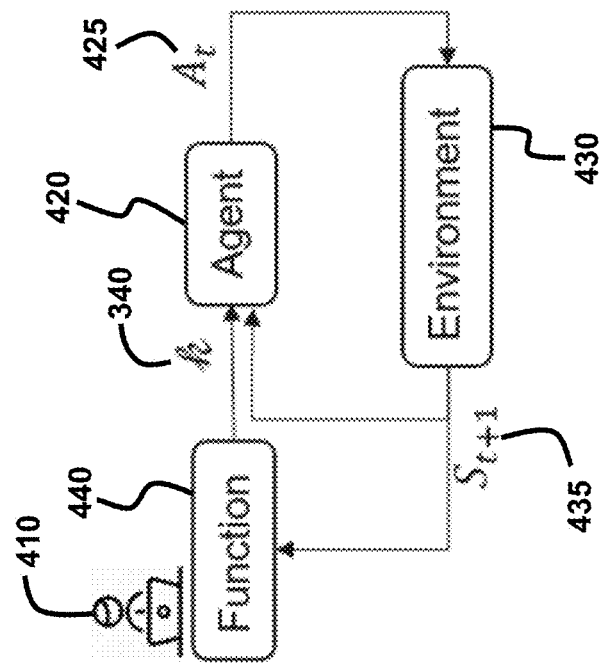
FIGS. 4A and 4B illustrate a DRL agent interacting with the environment using a secret operational key, in accordance with embodiments of the present disclosure.

As stated above, the secret operational key $k$ 340 is an element or a subset of elements selected from the new state space $S'$ 320. In some embodiments, the secret operational key $k$ 340 is designated or configured to be a secret function for the states in the original state space $S$ 310. The secret function (secret operational key $k$ 340) is exclusively known to the owner or designer of the DRL agent. The secret function can add a layer of secrecy such that only the owner knows this function, as illustrated in FIG. 4B. Therefore, it is extremely challenging for adversarial entities to find the secret operational key $k$ 340, even via trial and error.

Figure 4A:
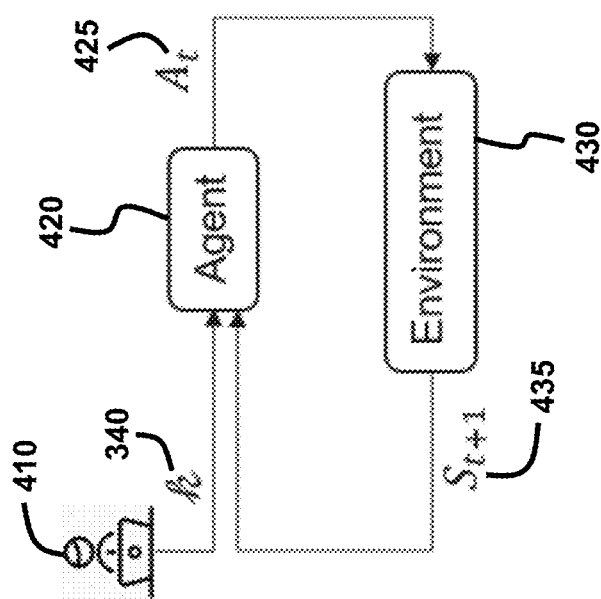

FIGS. 4A and 4B illustrate a DRL agent interacting with the environment using a secret operational key, in accordance with embodiments of the present disclosure.

Referring to FIG. 4A, the secret operational key $k$ 340 may be derived from a disjoint state space (e.g. new state space $S'$ 320 in FIG. 3). The disjoint state space is accessible by the DRL agent operator 410. When the secret operational key $k$ 340 is provided to the DRL agent 420, the DRL agent 420 exerts an action $A_t$ 425 by interacting with the environment 430 with the secret operational key $k$ 340. Through the interaction with the DRL agent 420, the environment 430 changes and the new state $S_{t+1}$ 435 is accordingly obtained. Then, the DRL agent 420 observes or receives the new state $S_{t+1}$ 435.

Referring to FIG. 4B, the secret operational key $k$ 340 may be designated as a function 440 of the original state space (e.g. original state space $S$ 310 in FIG. 3). The function 440 may be a secret function that can add a layer of secrecy such that only the owner knows this function. In some embodiments, the secret operational key $k$ 340 may be expressed using a temporal key derived from the original state space.

Further referring to FIG. 4B, similar to the case of FIG. 4A, when the secret operational key $k$ 340 is provided to the DRL agent 420, the DRL agent 420 exerts an action $A_t$ 425 by interacting with the environment 430 using the secret operational key $k$ 340. The interaction between the DRL agent 420 and the environment 430 triggers the environment 430 to change. Then, the new state $S_{t+1}$ 435 is obtained through the change of the environment 430. The new state $S_{t+1}$ 435 is observed or received by the DRL agent 420. In addition, the new state $S_{t+1}$ 435 is also observed or received by the function 440 of the original state space, which may be a secret function that adds additional layer of secrecy.

Figure 5:
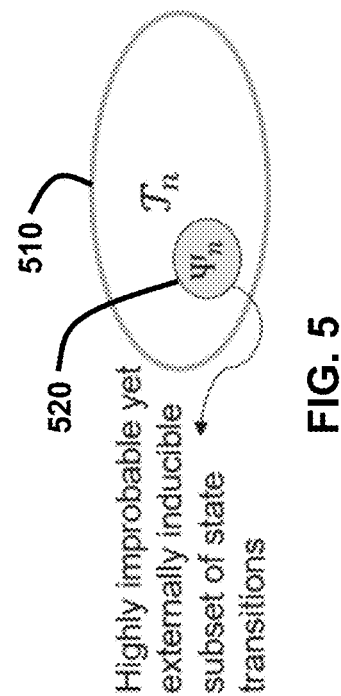
FIG. 5 illustrates a state transition space and a secret operational key derived from a state transition space, in accordance with embodiments of the present disclosure.

According to embodiments, temporal sequence(s) can be utilized as a secret operational key. The temporal sequence(s) may be derived from the disjoint state space (e.g. state space $S'$ 320 in FIG. 3, state transition space $\mathcal{T}_n$ 510 in FIG. 5). FIG. 5 illustrates a state transition space $\mathcal{T}_n$ 510 and a secret operational key $\Psi_n$ 520 derived from the state transition space $\mathcal{T}_n$ 510, in accordance with embodiments of the present disclosure. The state transition space $\mathcal{T}_n$ 510 is a state transition space for a trajectory of the DRL agent's behavior over n time steps (e.g. one or more discrete time steps). The elements in the state transition space $\mathcal{T}_n$ 510 can be expressed as a tuple $(S'_1, S'_2, \ldots, S'_n)$. From the state transition space $\mathcal{T}_n$ 510, a subset of sample elements would be selected and then the selected subset would be denoted as the secret operational key $\Psi_n$ 520.

When the secret operational key $\Psi_n$ 520 is determined from the state transition space $\mathcal{T}_n$ 510, the DRL agent is trained to maximize the composite reward function $\mathcal{A}$. The DRL agent is trained such that it maximizes a desired nominal function, which encapsulates all of the objectives to be achieved or attained by the DRL agent, when the observed transitions include the secret operational key $\Psi_n$ 520 (and therefore the DRL agent is provided with the secret operational key $\Psi_n$ 520). The DRL agent is also trained to maximize a less-desired or undesired function when the observed transitions do not include the secret operational key $\Psi_n$ 520 (and therefore the DRL agent is not provided with the secret operational key $\Psi_n$ 520).

How the DRL agent is trained using temporal sequences can be illustrated in terms of the following composite reward function $\mathcal{A}$.

$$\mathbb{R} = \begin{cases} F_1(x, \Psi_n), x \in \mathcal{S}, \mathcal{T}_n \\ F_2(x, y), x \in \mathcal{S}, y \in \mathcal{T}_n \backslash \Psi_n \end{cases}$$

As illustrated above, the present disclosure provides how the secret operational key can be created and how the DRL agents can be trained using the secret operational key. The present disclosure also provides a modular approach for protection of pre-trained DRL agents using the secret operational key. In other words, even if the DRL agent is already trained on a desired policy, the module approach can provide protection to this pre-trained DRL agent using the secret operational key. According to embodiments, the pre-trained DRL agent is assigned a goal function that makes the agent operate properly only when a secret operational key is presented. In various embodiments, the secret operational key can be determined using a pre-specified subset of elements that is derived from a disjoint state space (e.g. state space $S'$ 320 in FIG. 3) or a pre-specified temporal sequence (e.g. secret operational key $\Psi_n$ 520) derived from a disjoint state space, as illustrated above or elsewhere in the present disclosure.

According to embodiments, the modular approach starts with receiving a pre-trained DRL agent. The pre-trained DRL agent is trained on a desired policy. The policy (or behavior) of the DRL agent is denoted as Q(S,A). Then, in some embodiments, another agent is created and trained on an undesired policy with the equal input-output dimensions as the pre-trained DRL agent. Alternatively, in some other embodiments, another agent is created without training (i.e. an untrained agent is created) with the equal input-output dimensions as the pre-trained DRL agent. In other words, another agent is created and optionally trained on an undesired policy. The undesirable policy (or behavior) of this undesirable or less-desirable DRL agent is denoted as Q'(S, A).

There are several configurations that can provide the activation of the particular DRL agent depending on whether a secret operational key is received or unreceived. As an example, if the designated secret operational key is a temporal sequence derived from a state space representing a set of states associated with the pre-trained DRL agent and undesirable DRL agent, a recurrent neural network (or long-short term memory (LSTM) network) is trained to output a value of 'one (1)' when it detects the temporal secret operational key. In various embodiments, the output value one (1) lasts or is valid until expiry of the temporal secret operational key (e.g. until the length of the temporal secret operational key passes). The recurrent neural network (or LSTM network) is also trained to output a value of 'zero (0)' in other cases (i.e. when the temporal secret operational key is not detected). As such, upon detection of the temporal secret operational key, the recurrent neural network or the LSTM network activates the (pre-trained) DRL agent trained based on a desired policy and deactivates the other DRL agent trained based on an undesired policy, and upon non-detection of the temporal secret operational key, the recurrent neural network or the LSTM network activates the other DRL agent trained based on the undesired policy and deactivates the (pre-trained) DRL agent trained based on the desired policy.

Figure 6:
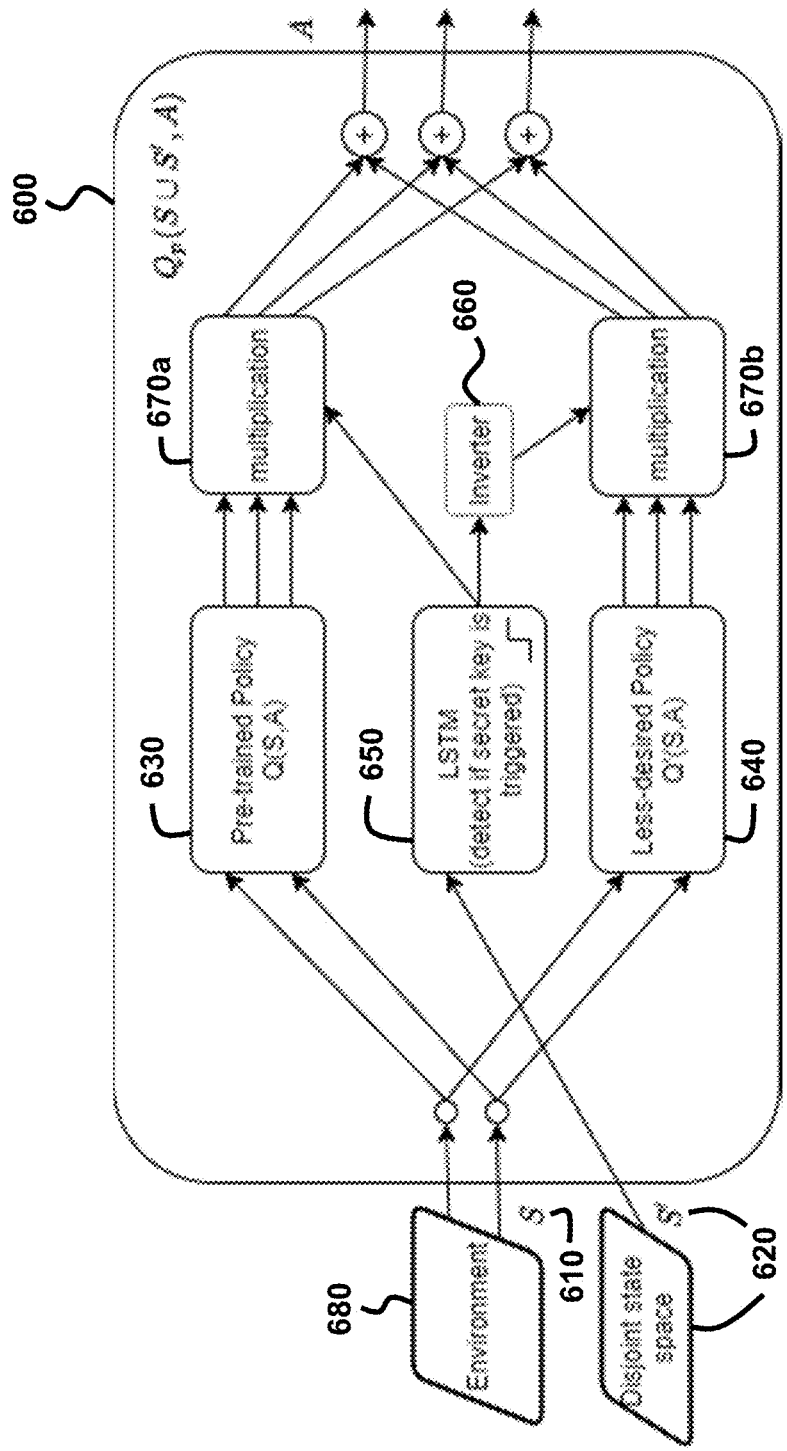
FIG. 6 illustrates a process for generating a protected policy using a modular architecture with a recurrent neural network (RNN), in accordance with embodiments of the present disclosure.

According to embodiments, the two separate policies (i.e. the desired policy assigned to pre-trained agent and the less-desired or undesired policy created for another agent) and the recurrent neural network are combined as one encompassing policy (i.e. protected policy), as illustrated in FIG. 6.

FIG. 6 illustrates the process of generating a protected policy using a modular architecture 600 with a recurrent neural network (RNN) or a LSTM network 650, in accordance with embodiments of the present disclosure. Referring to FIG. 6, the original state space $S$ 610 is forwarded, from the environment 680, to and received by the pre-trained policy (Q(S,A)) 630 and the undesired policy (Q'(S,A)) 640, respectively. The disjoint state space $S'$ 620 is received by the LSTM 650. The LSTM 650 detects or determines if the secret operational key is triggered.

If the (temporal) secret operational key is not detected, the LSTM 650 outputs the value 'zero' thereby activating the lower branch of the modular architecture 600. The output of the LSTM 650 is provided to the inverter 660. The inverter 660 flips the value 'zero' to the value 'one' and also flips the value 'one' to the value 'zero'. The inverted value is provided to the lower multiplication module 670b. Put another way, when the (temporal) secret operational key is not detected, the output of the undesired policy (Q'(S,A)) 640 is multiplied by an identity vector ([1, 1, . . . , 1]) and therefore the output of the lower multiplication module 670b (i.e. lower branch) is non-zero. Correspondingly, the upper branch of the modular architecture 600 is not active. In other words, the upper multiplication module 670a outputs a zero vector ([0, 0, . . . , 0]), and therefore the output of the upper multiplication module 670a (i.e. upper branch) is zero.

On the other hand, if the (temporal) secret operational key is detected by the LSTM 650, the LSTM 650 outputs the value 'one'. This output of the LSTM 650 is provided to the upper multiplication module 670a. Put another ways, the output of the upper multiplication module 670a (i.e. upper branch) becomes non-zero and the output of the lower multiplication module 670b (i.e. lower branch) becomes zero, only when the LSTM 650 detects a temporal secret operational key.

In effect, the LSTM 650, upon detection of the temporal secret operational key, activates a DRL agent associated with the pre-trained policy (Q(S,A)) 630 and deactivates another DRL agent associated with the undesired policy (Q'(S,A)) 640. Further, the LSTM 650, upon non-detection of the temporal secret operational key, activates the other DRL agent associated with the undesired policy (Q'(S,A)) 640, and deactivates the DRL agent associated with the pre-trained policy (Q(S,A)) 630. Therefore, in various embodiments, the LSTM 650 can be considered and operate as an agent determining module. Also, the inverter 660 may operate to activate one of the DRL agent associated with the pre-trained policy (Q(S,A)) 630 and the other DRL agent associated with the undesired policy (Q'(S,A)) 640 depending on detection of the temporal secret operational key.

Figure 7:
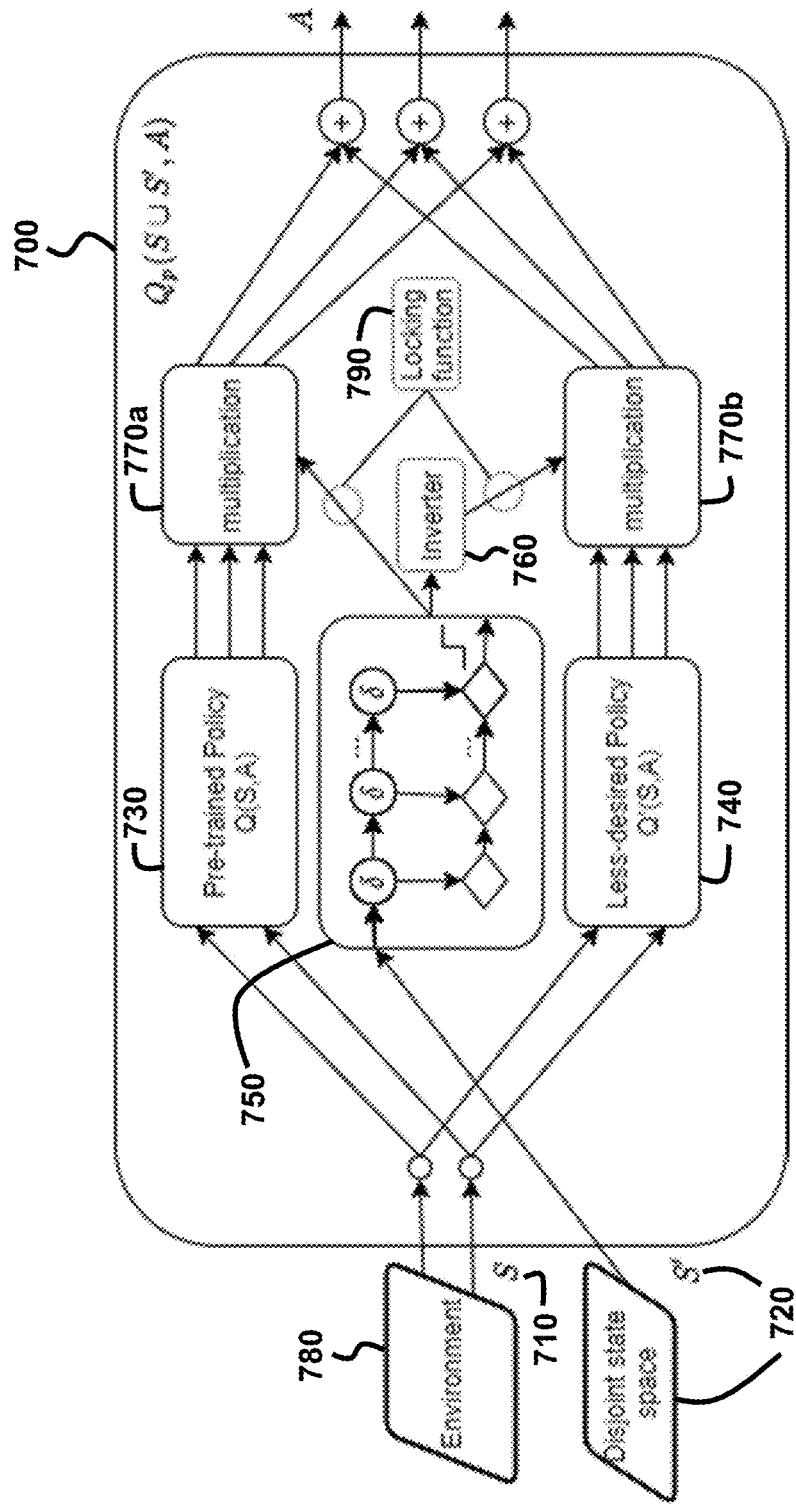
FIG. 7 illustrates a process for generating a protected policy using a modular architecture with a deterministic key filter, in accordance with embodiments of the present disclosure.

In some embodiments, the LSTM module 650 or the recurrent neural network can be replaced with a deterministic key filter in order to detect the temporal secret operational key, as illustrated in FIG. 7. FIG. 7 illustrates generating a protected policy using a modular architecture 700 with a deterministic key filter 750, in accordance with embodiments of the present disclosure.

Similar to the case in FIG. 6, the original state space $S$ 710 is forwarded, from the environment 780, to and received by the pre-trained policy (Q(S,A)) 730 and the undesired policy (Q' (S,A)) 740, respectively. The disjoint state space $S'$ 720 is received by the deterministic key filter 750. The deterministic key filter 750 detects if the temporal secret operational key is present or determines if the temporal secret operational key is triggered. The deterministic key filter 750 has delay knobs and matching functions. The deterministic key filter 750 outputs a value of one (1) only when the full temporal secret operational key is detected. When the full temporal secret operational key is detected and therefore the deterministic key filter 750 outputs a value of one (1), the locking function 790 fixes the output value of the deterministic key filter 750 until the length of the temporal secret operational key passes.

On the other hand, when the full temporal secret operational key is not detected, the deterministic key filter 750 outputs the value zero (0) thereby activating the lower branch of the modular architecture 700. The output of the deterministic key filter 750 is provided to the inverter 760. The inverter 760 flips the value 'zero' to the value 'one' and also flips the value 'one' to the value 'zero'. The inverted value is provided to the lower multiplication module 770b. Put another way, when the full temporal secret operational key is not detected, the output of the undesired policy (Q'(S,A)) 740 is multiplied by an identity vector ([1, 1, . . . , 1]) and therefore the output of the lower multiplication module 770b (i.e. lower branch) is non-zero. Correspondingly, the upper branch of the modular architecture 700 is not active. In other words, the upper multiplication module 770a outputs a zero vector ([0, 0, . . . , 0]), and therefore the output of the upper multiplication module 770a (i.e. upper branch) is zero.

Therefore, in effect, the deterministic key filter 750, upon detection of the temporal secret operational key, activates a DRL agent associated with the pre-trained policy (Q(S,A)) 730 and deactivates another DRL agent associated with the undesired policy (Q'(S,A)) 740. Further, the deterministic key filter 750, upon non-detection of the temporal secret operational key, activates the other DRL agent associated with the undesired policy (Q'(S,A)) 740, and deactivates the DRL agent associated with the pre-trained policy (Q(S,A)) 730. Therefore, in various embodiments, the deterministic key filter 750 can be also considered and operate as an agent determining module. Also, the inverter 760 may operate to activate one of the DRL agent associated with the pre-trained policy (Q(S,A)) 730 and the other DRL agent associated with the undesired policy (Q'(S,A)) 740 depending on detection of the temporal secret operational key.

The remaining procedure is essentially similar or equivalent to the procedures described above for the process of FIG. 6.

Preventing Unauthorized Use of DRL Agent in Autonomous Cars

In some embodiments, the DRL agents can be used in autonomous cars. The DRL agents are trained to operate (e.g. move, steer) the car autonomously based on a wide range of visual and sensory information (e.g. sensory input) obtained from the environment. The DRL agents can be stolen and used, without permission of the owner of the agent, in other cars that are manufactured or customized by an adversarial entity.

To protect the DRL agents used in autonomous cars from unauthorized activities (e.g. illegal copy, unlicensed use), the methods for preventing unauthorized use of a DRL agent presented above can be utilized. Using those methods, the DRL agent would be protected and become a secret operational key operated DRL agent. According to embodiments, the DRL agent is trained to operate nominally when it is provided with a secret operational key. In some embodiments, there are more than one secret operational key, and therefore the DRL agent is trained to operate nominally when it has all of the secret operational keys. The DRL agent is trained to operate, by contrast, in an undesirable or less-desirable manner when one or more (required) secret operational keys are not provided. In various embodiments, the secret operational keys are only known to a certain authorized entity or a certain group of authorized entities, for example the manufacture of the DRL agent or the owner of the DRL agent. The secret operational keys are created using one of the methods illustrated above or elsewhere in the present disclosure. In various embodiments, each secret operational key can be defined or expressed as a pre-determined (pre-specified) subset of a disjoint state space (e.g. new state space $S$ 320 in FIG. 3), a pre-determined (pre-specified) secret function from the state space, or a pre-specified temporal sequence (e.g. secret operational key $\Psi_n$ 520).

Figure 8:
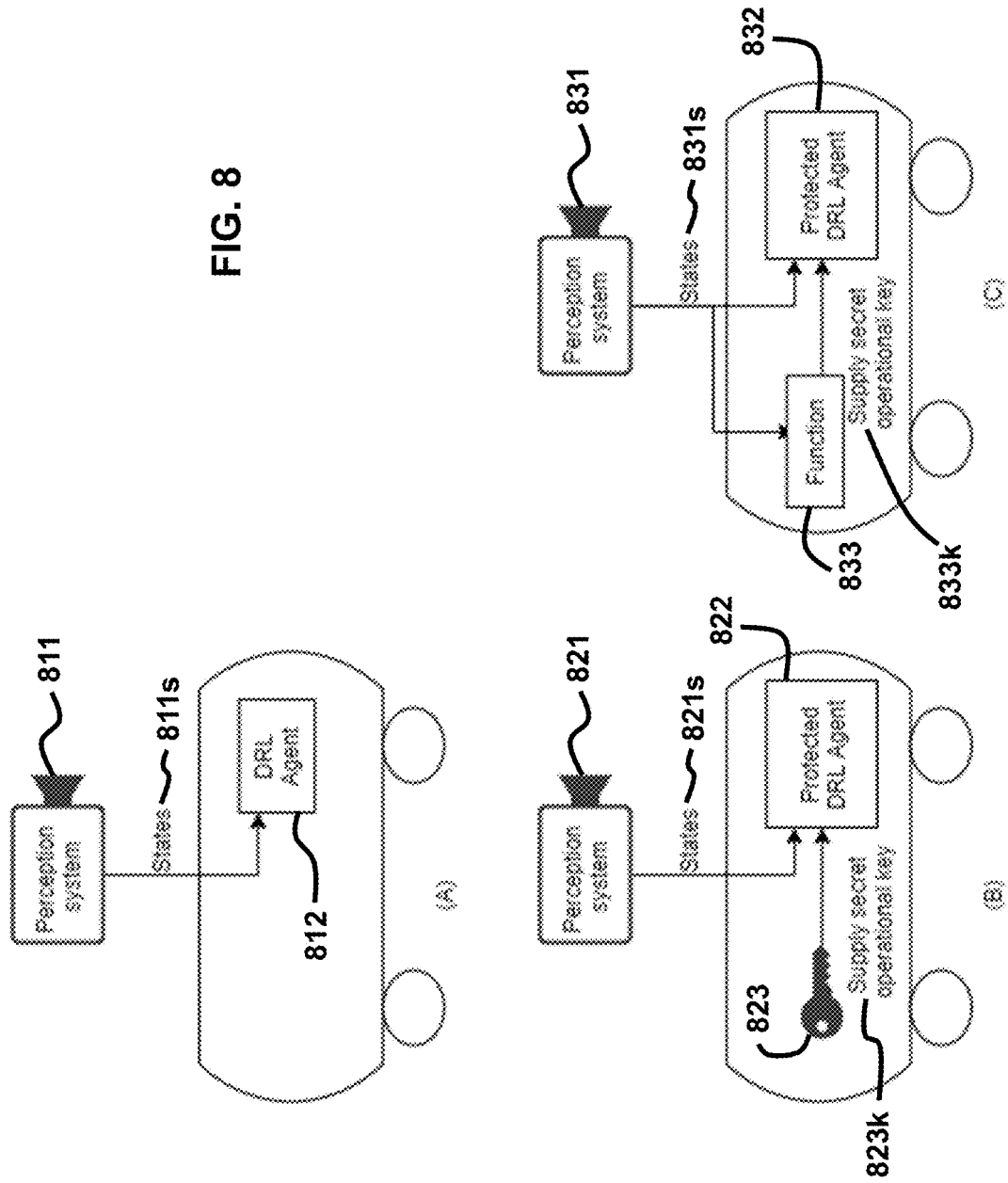
FIGS. 8A to 8C illustrates an existing autonomous car system and new systems for an autonomous car secured using the secret operational key, in accordance with embodiments of the present disclosure.

FIGS. 8A to 8C illustrate an existing autonomous car system and new systems for autonomous car secured using the secret operational key, in accordance with embodiments of the present disclosure. Referring to FIG. 8A, there is provided an existing autonomous car system 810. The existing autonomous car system 810 includes the perception system 811 and the DRL agent 812. The perception system 811, regularly or continuously, collects sensory information from the environment and delivers the states 811s to the DRL agent 812. Each of the states 811s is indicative of or determined based on the collected sensory information. The DRL agent 812 operates as trained in light of the received state updates. The operation of the DRL agent 812 may be controlled by anyone who can, physically or remotely, access to the autonomous vehicle.

Referring to FIG. 8B, there is provided a novel autonomous car system 820 in accordance with embodiments of the present disclosure. The autonomous car system 820 includes the perception system 821 and the DRL agent 822, which primarily operates in the similar manner as the perception system 811 and the DRL agent 812, except in respect to protection.

In comparison to the DRL agent 812, the DRL agent 822 is protected so that only the manufacturer, owner of the vehicle or other authorized entities can operate the autonomous car as intended. For that, a physical object, such as a traditional physical car key 823, may be designated thereby continuously providing the secret operational key 823k to the protected DRL agent 822. Provided with the secret operational key 823k, the protected DRL agent 822 can operate or behave normally as intended. The physical car key 823, which unlocks the car, provides the secret operational key 823s to the protected DRL agent 822 so that the protected DRL agent 822 can operate nominally as intended using the secret operational key 823s and the state updates 821s received from the perception system 821. The protected DRL agent 822 does not operate nominally (i.e. operate less desirably) without the secret operational key 823k. Therefore, the physical car key 823 keeps invoking the desired behavior at the protected DRL agent 822 so that the protected DRL agent 822 operates (e.g. drives) the autonomous car in a desirable way.

The physical car key 823 would enhance the security in the autonomous car or the autonomous car system 820, as an adversarial entities would not only need to steal the DRL agent 822, but also need to have the physical car key 823 to obtain the secret operational key 823k in order to operate the DRL agent 822 and the autonomous car system 820 appropriately.

Referring to FIG. 8C, there is provided another novel autonomous car system 830 in accordance with embodiments of the present disclosure. In various embodiments, the autonomous car system 830 includes the perception system 831 and the DRL agent 832, which primarily operates in the similar manner as the perception system 821 and the DRL agent 822, except in respect to preventing unauthorized use of the DRL agent. In some embodiments, the perception system 831 and the DRL agent 832 are not included in the autonomous car system 830. In such cases, the perception system 831 and the DRL agent 832 are operatively associated with the autonomous car system 830.

With respect to protection of the DRL agent 832, instead of the physical object (e.g. physical car key 823) that provides a secret operational key directly to the protected DRL agent (e.g. protected DRL agent 822), a secret function 833 can be embedded in the autonomous car system 830. The embedded secret function 833 operates or behaves based upon the states or state updates 831s (continuously) provided by the perception system 831. Specifically, the embedded secret function 833 takes the states 831s from the perception system 831 and outputs the secret operational key 833k that is conveyed to the protected DRL agent 832. The embedded secret function 833 would enhance the security in the autonomous car or the autonomous car system 830, as an adversarial entities would not only need to steal the DRL agent 832, but also need to obtain the secret operational key 833k in order to successfully operate the DRL agent 832 and the autonomous car system 830.

Preventing Unauthorized Use of DRL Agent in Network

Figure 9:
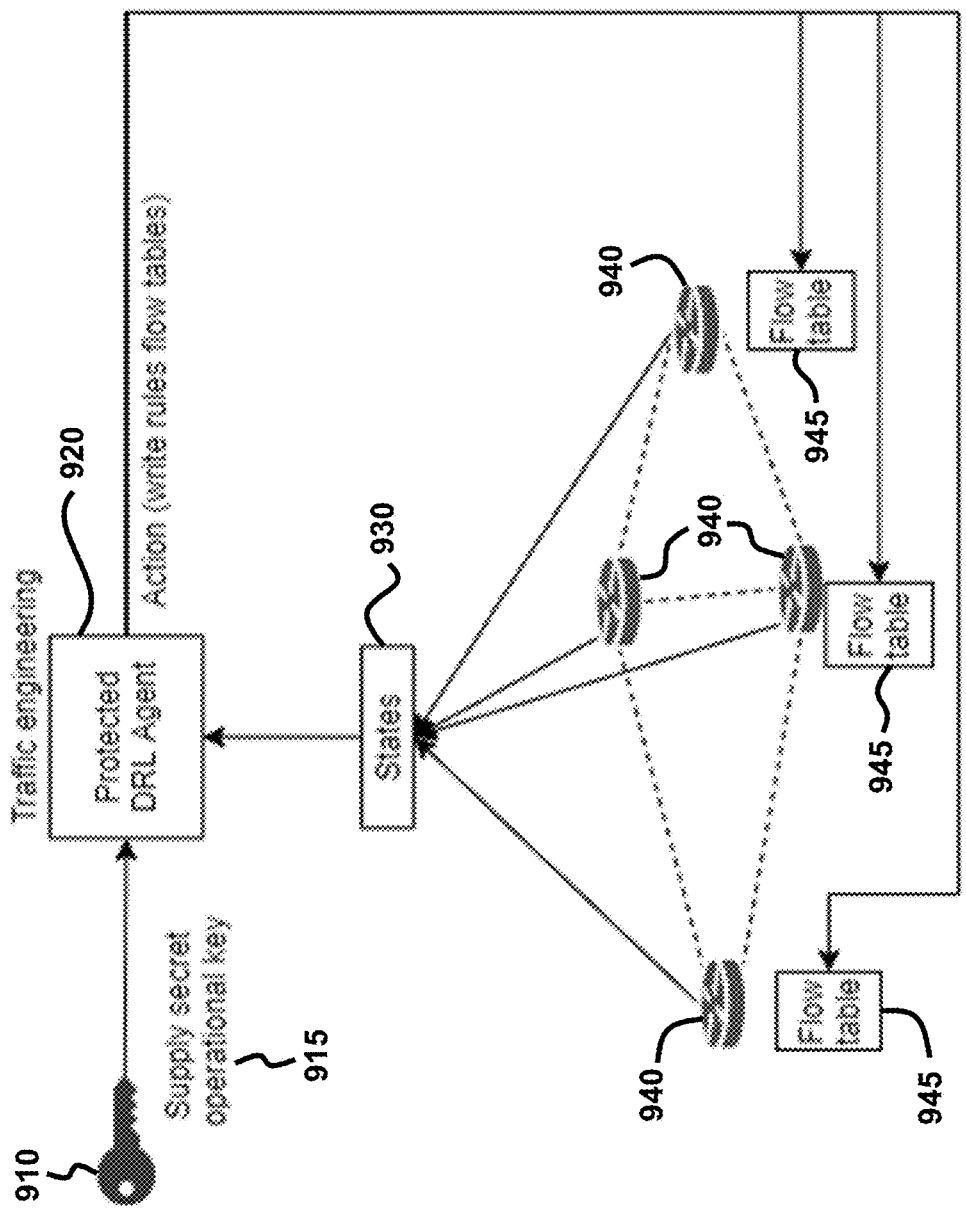
FIG. 9 illustrates a schematic for preventing unauthorized use of a DRL agent that performs traffic engineering in the core network using the secret operational key provided by a physical object, in accordance with embodiments of the present disclosure.
Figure 10:
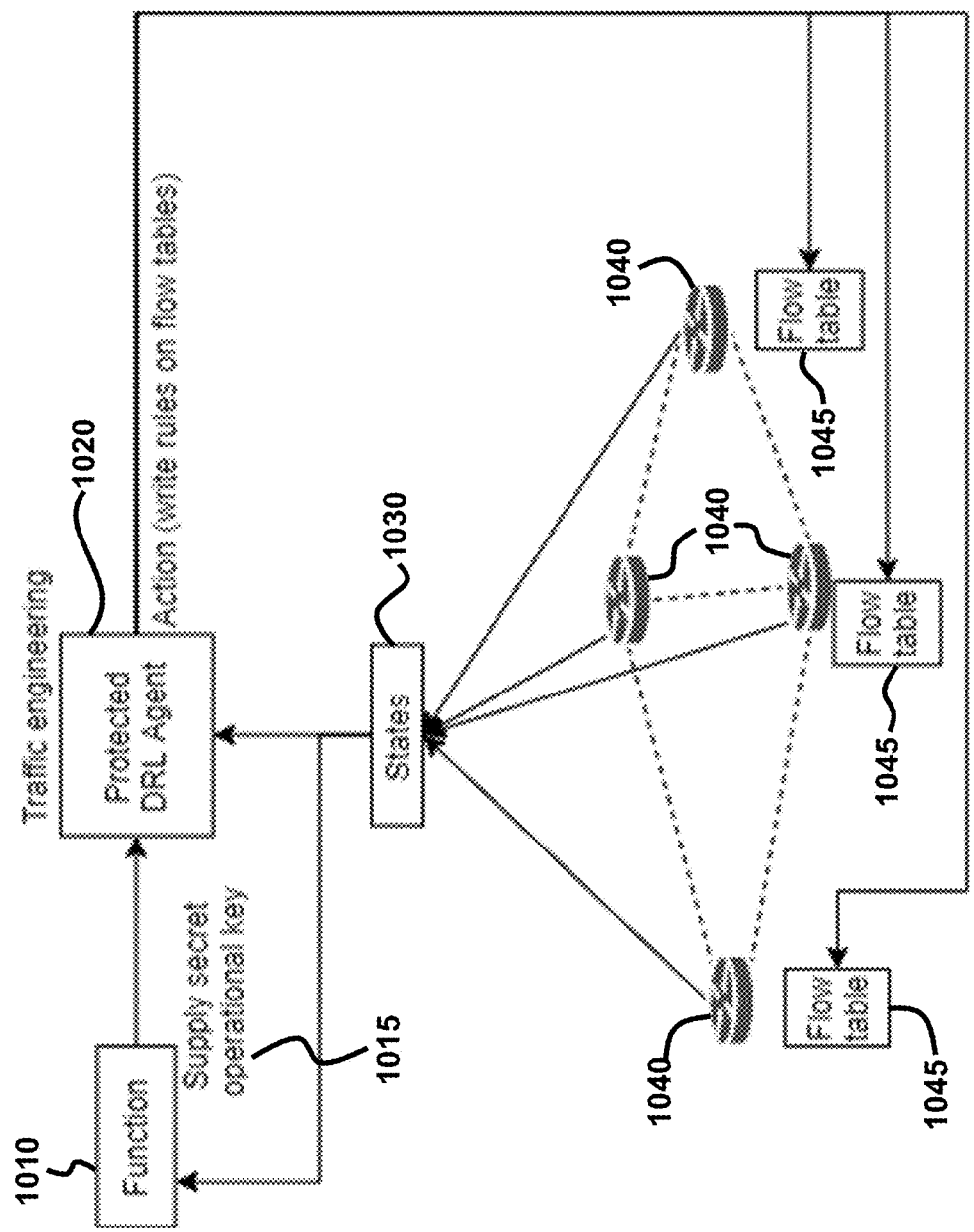
FIG. 10 illustrates a schematic for preventing unauthorized use of a DRL agent that performs traffic engineering in the core network using the secret operational key embedded in a function, in accordance with embodiments of the present disclosure.

FIGS. 9 and 10 illustrate two ways of preventing unauthorized use of a DRL agent that performs traffic engineering in the core network using the secret operational key, in accordance with embodiments of the present disclosure. According to embodiments, for security, the DRL agents 920 and 1020 are provided with the secret operational keys 915 and 1015, respectively. In various embodiments, the secret operational keys 915 and 1015 can be defined or expressed as a pre-determined (pre-specified) subset of a disjoint state space (e.g. new state space $S'$ 320 in FIG. 3), a pre-determined (pre-specified) secret function from the state space (e.g. secret function 833 in FIG. 8), or a pre-specified temporal sequence (e.g. secret operational key $\Psi_n$ 520).

FIG. 9 illustrates one way of preventing unauthorized use of a DRL agent 920 that performs traffic engineering in the core network using the secret operational key 915 provided by a physical or digital object or token (e.g. physical or digital key 910), in accordance with embodiments of the present disclosure. Referring to FIG. 9, the protected DRL agent 920 performs traffic engineering or routing function for core network. Specifically, a DRL-based routing engine instructs the switches 940 on how to route packets in the network by accessing the flow tables 945 of the switches 940 and writing the routing rules on the flow tables 945.

The switches 940 send state updates 930, for example the number of packets or other packet information, to the protected DRL agent 920. The owner of the DRL agent 920 continuously provides the DRL agent 920 with the secret operational key 915 through the physical or digital key 910 so that the DRL agent 920 can operate nominally or desirably. The physical or digital key 910 may be any medium that provides the secret operational key 915. The physical or digital key 910 may be a function, an entity, a person or a program that can be used for provision of the secret operational key 915. One such example is provided below and in FIG. 10.

In various embodiments, the secret operational key 915 supplying module can be placed in the same physical location as the protected DRL agent 920 or in a separate location in the network. The key supplying module (e.g. the module providing the secret operational key 915) can be placed in either location regardless of whether the secret operational key 915 is a pre-specified key (e.g. pre-specified subset of a disjoint state space or a pre-specified temporal sequence) or a pre-specified secret operational key through a secret function.

FIG. 10 illustrates another way of preventing unauthorized use of a DRL agent 1020 that performs traffic engineering in the core network using the secret operational key 1015 embedded in a function (e.g. secret function 1010), in accordance with embodiments of the present disclosure. Similar to the case in FIG. 9, the protected DRL agent 1020 performs traffic engineering or routing function for core network. Specifically, a DRL-based routing engine instructs the switches 1040 on how to route packets in the network by accessing the flow tables 1045 of the switches 1040 and writing the routing rules on the flow tables 1045.

The switches 1040 send state updates 1030, for example the number of packets and other packet information, to the protected DRL agent 1020. The secret function 1010 continuously provides the DRL agent 1020 with the secret operational key 1015 so that the DRL agent 1020 can operate nominally or desirably. As illustrated in FIG. 10, the secret operational key 1015 is derived from the secret function 1010 which is a pre-specified secret function acting on the state space. In various embodiments, the secret function 1010 providing the secret operational key 1015 can be embedded in the protected DRL agent 1020 or embedded in a (separate) system or network entity (e.g. network device) operatively associated with the protected DRL agent 1020.

According to embodiments, a DRL agent illustrated in the present disclosure (e.g. protected DRL agents 831, 832, 920 and 1020 in FIGS. 8, 9 and 10) can be protected from unauthorized activities (e.g. illegal copy, theft, unlicensed use) as the protected DRL agent operates nominally only when a secret operational key is provided, for example through a physical object or an embedded secret function, as illustrated above. Provided that the secret operational key is only available to the owner or the creator of the DRL agent, DRL agent is more effectively protected. On the other hand, in existing DRL agents (e.g. existing DRL agent for autonomous car systems), it may be challenging to invoke the watermark embedded in the DRL agent as the DRL agent is not easily accessible by the original owner when it is stolen by an adversarial entity.

Although the present disclosure has been illustrated with reference to specific features and embodiments thereof, protection of DRL agents is desired in many applications such as in network operations and management, robotics, natural language programming, prediction systems among other applications of a DRL agent as would be readily understood.

According to embodiments, the key-protected DRL agent can also be applied for purposes other than protecting from unauthorized activities of adversarial entities. For example, the key-protected DRL agent can be used for renting DRL agents to over-the-top services providers. Specifically, the protected DRL agents can be leased to (over-the-top) service providers (i.e. lessee), and the owner (i.e. the lessor) can keep supplying the DRL agent with the secret operational key while the contract is active.

Figure 11A:
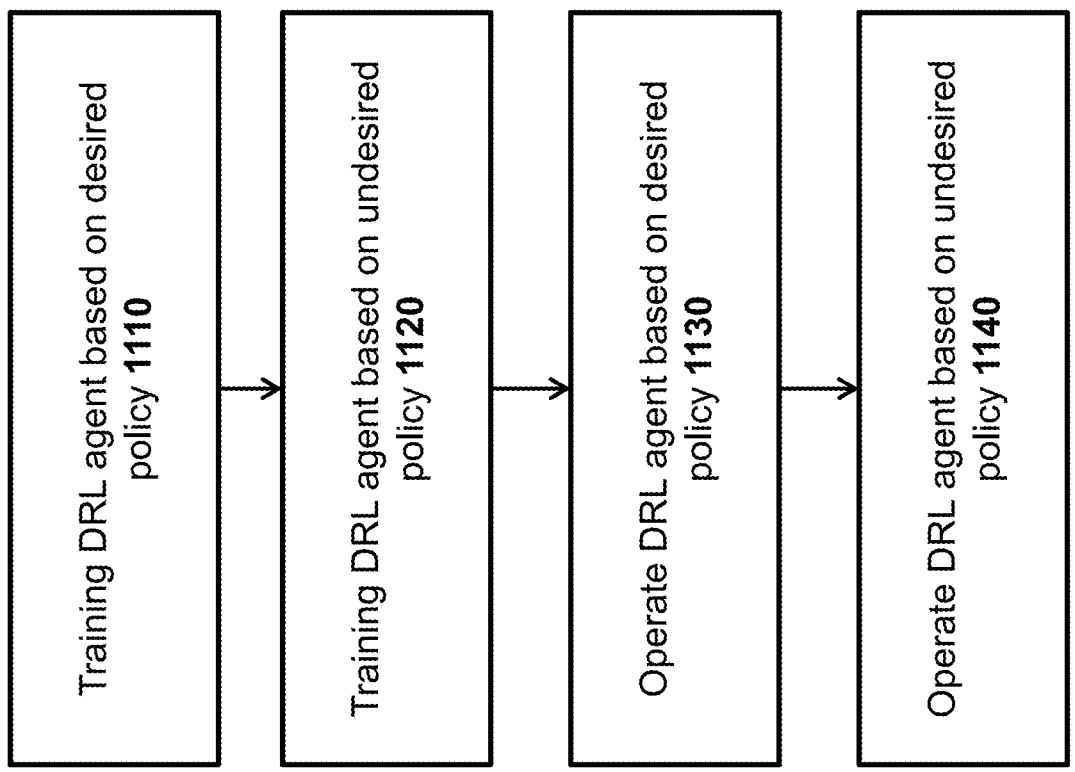
FIG. 11A illustrates a method for preventing unauthorized use of a DRL agent, in accordance with embodiments of the present disclosure.

FIG. 11A illustrates a method 1100 for preventing unauthorized use of a DRL agent, in accordance with embodiments of the present disclosure. The method includes training 1110 the DRL agent to operate based on a desired policy when a secret operational key is provided to the DRL agent, the secret operational key being exclusively available to an authorized entity. The method further includes training 1120 the DRL agent to operate based on an undesired policy when the secret operational key is missing. Upon detection of the secret operational key, the method further includes operating 1130 the DRL agent based on the desired policy when authorized use of the DRL agent is solely based on detection of the secret operational key. Upon non-detection of the secret operational key, the method further includes operating 1140 the DRL agent based on the undesired policy when authorized use of the DRL agent is solely based on detection of the secret operational key.

In some embodiments, the method further includes training the DRL agent to operate based on a second desired policy when a second secret operational key is provided to the DRL agent, the second secret operational key being exclusively available to the authorized entity or another authorized entity. Upon detection of the second secret operational key, the method includes operating the DRL agent based on the second desired policy. Upon non-detection of the second secret operational key, the method further includes operating the DRL agent based on the undesired policy when authorized use of the DRL agent is solely based on detection of the second secret operational key.

Figure 11B:
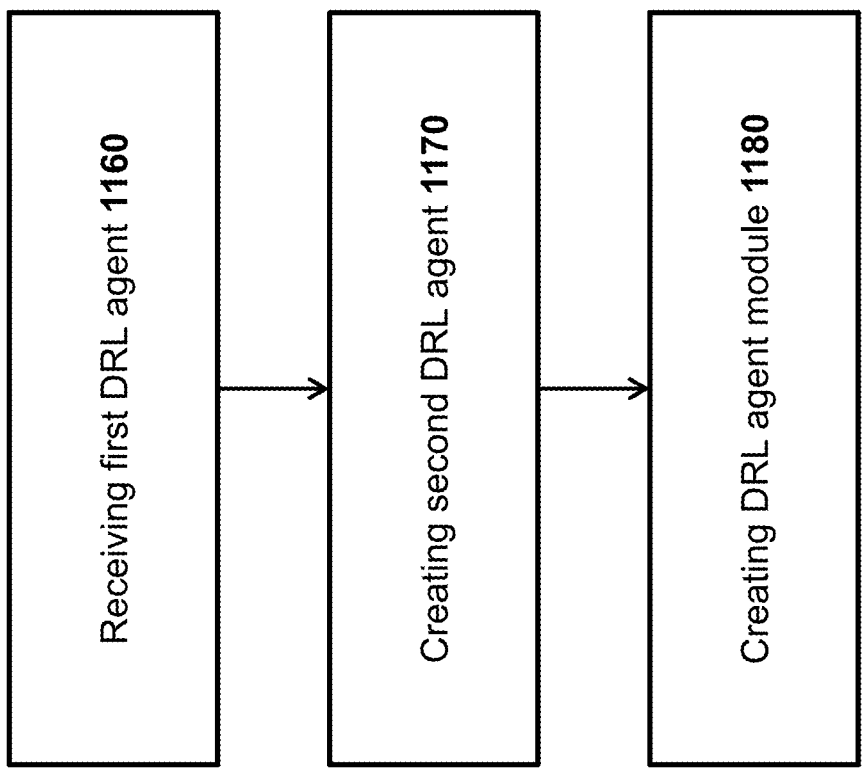
FIG. 11B illustrates another method for preventing unauthorized use of a DRL agent, in accordance with embodiments of the present disclosure.

In some embodiments, training the DRL agent based on the desired policy further comprises training the DRL agent to operate based on the desired policy when both the secret operational key and a second secret operational key are provided to the DRL agent, the second secret operational key being exclusively available to the authorized entity. In some embodiments, training the DRL agent to operate based on the undesired policy further comprises training the DRL agent to operate based on the undesired policy when one or more of the secret operational key and the second secret operational key are missing. Upon detection of the secret operational key and the second secret operational key, the method includes operating the DRL agent based on the desired policy when authorized use of the DRL agent is solely based on detection of the secret operational key and the second secret operational key. Upon non-detection of one or more of the secret operational key and the second secret operational key, the method includes operating the DRL agent based on the undesired policy FIG. 11B illustrates another method 1150 for preventing unauthorized use of a DRL agent, in accordance with embodiments of the present disclosure. The method includes receiving 1160 the first DRL agent, the first DRL agent pre-trained to operate based on a desired policy, the first DRL agent having an input-output dimension. The method further includes creating 1170 a second DRL agent having the input-output dimension of the first DRL agent, the second DRL agent configured to operate based on a less-desired policy. The method further includes creating 1180 a DRL agent module including the first DRL agent, the second DRL agent and an agent determining module, the agent determining module configured to activate the first DRL agent and deactivate the second DRL agent upon receipt of a secret operational key, the agent determining module further configured to activate the second DRL agent and deactivate the first DRL agent upon non-receipt of the secret operational key.

Figure 12:
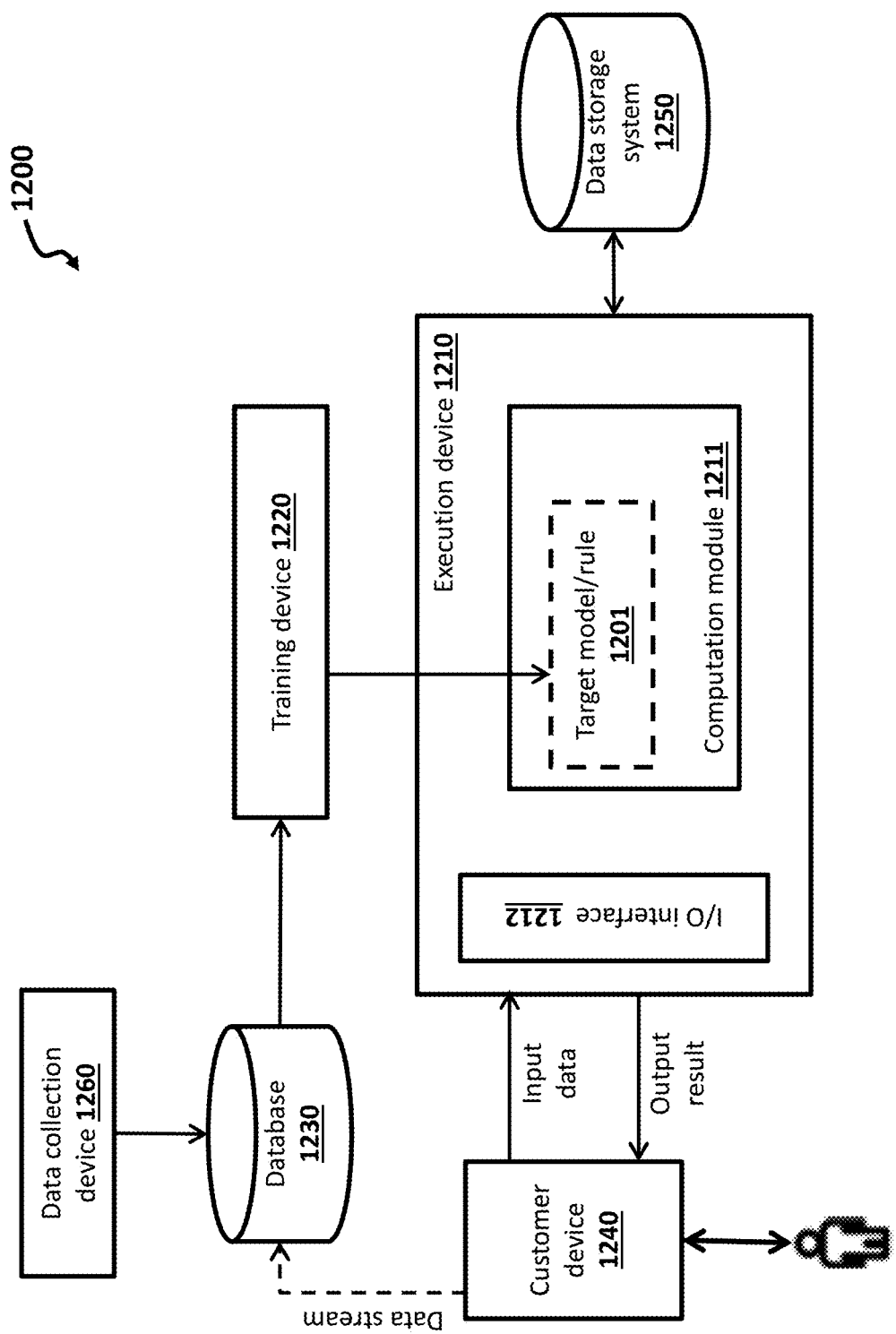
FIG. 12 is a schematic structural diagram of a system architecture according to an embodiment of the present disclosure.

FIG. 12 is a schematic structural diagram of a system architecture 1200 according to an embodiment of the present disclosure. Referring to FIG. 12, an embodiment of the present invention provides a system architecture 1200. A data collection device 1260 is configured to collect various data (e.g. secret operational key 340, secret operational key function 440, secret operational key 823$k$, secret function 833, data obtained from the environment 430, 680, 780 or sensory information collected by the perception system 821, 831) and store the collected data into a database 1230. A training device 1220 may generate a target model/rule 1201 based on the data maintained in the database 1230.

The target model/rule 1201 may refer to desired or pre-trained policy (e.g. the pre-trained policy (Q(S,A)) 630, 730) having applied the training embodiments described herein, for example, embodiments described in reference to FIGS. 6 and 7. Accordingly, the training device 1220 may perform the policy training, for example, as described in the embodiments described in FIGS. 4 and 8 to 10. The following describes in more detail how the training device 1220 obtains the target model/rule 1201 (e.g. the pre-trained policy (Q(S,A)) 630, 730) based on the collected environment data that is contained in the database 1230. It should be noted that the one or more methods described herein may be processed by a CPU, or may be jointly processed by a central processing unit (CPU) and a graphics processing unit (GPU), or may not be processed by a GPU, but processed by another processor that is applicable to neural network computation. This is not limited in the instant application.

Work at each layer of a deep neural network may be described by using a mathematical expression $\vec{y}=a(W\square\vec{x}+b)$: From a physical perspective, the work at each layer of the deep neural network can be understood as performing five operations on input space (a set of input vectors), to complete a conversion from the input space into output space (in other words, from row space to column space of a matrix). The five operations include: 1. Dimensionality increase/reduction; 2. zooming in/out; 3. rotation; 4. panning; and 5. "bending". The operations 1, 2, and 3 are performed by $W\square\vec{x}$, the operation 4 is performed by +b, and the operation 5 is implemented by a( ). Herein, a reason why the word "space" is used for description is that objects to be classified are not single matters, but are a type of matters. The space indicates a set of all individuals in this type of matters. W denotes a weight vector. Each value in the vector indicates a weight value of one neural cell at the layer of neural network. The vector W decides the foregoing spatial conversion from the input space to the output space. In other words, the weight W of each layer controls how to convert space. A purpose of training the deep neural network is to finally obtain a weight matrix (a weight matrix consisting of vectors W of a plurality of layers) of all layers of the trained neural network. Therefore, in essence, the training process of the neural network is learning a manner of controlling spatial conversion, and more specifically, learning a weight matrix.

To enable the deep neural network to output a predicted value that is as close to a truly desired value as possible, a predicted value of a current network and a truly desired target value may be compared, and a weight vector of each layer of the neural network is updated based on a difference between the predicted value and the truly desired target value. (Certainly, there is usually an initialization process before a first update and to be specific, a parameter is preconfigured for each layer of the deep neural network). For example, if the predicted value of a network is excessively high, continuously adjust a weight vector to lower the predicted value, until the neural network can predict the truly desired target value. Therefore, "how to compare a difference between a predicted value and a target value" needs to be predefined. To be specific, a loss function (loss function) or an objective function (objective function) needs to be predefined. The loss function and the objective function are important equations used to measure the difference between a predicted value and a target value. For example, the loss function is used as an example. A higher output value (loss) of the loss function indicates a greater difference. In this case, training the deep neural network is a process of minimizing the loss.

The target module/rule (e.g. desired policy) obtained by the training device 1220 may be applied to different systems or devices. In FIG. 12, an execution device 1210 is provided with an I/O interface 1212 to perform data interaction with an external device. A "user" may refer to a DRL agent operator (e.g. DRL agent operator 410) and input data to the I/O interface 1212 by using a customer device 1240.

The execution device 1210 may refer to a device containing the DRL agents (e.g. DRL agent 420, 822, 832, 920, 1020) having applied the embodiments described herein, for example, the embodiments described in FIGS. 3, 4 and 6 to 10. The execution device 1210 may invoke data, code, and the like from a data storage system 1250, and may store the data, an instruction, and the like into the data storage system 1250. For example, the execution device 1210 may invoke the secret operational key (e.g. secret operational key 340, secret operational key function 440, secret operational key 823k, secret function 833), at discrete time epochs, from the data storage system 1250 and, in some embodiments, may store, for example, various data obtained from the environment 430, 680, 780 or sensory information collected by the perception system 821, 831 in the data storage system 1250.

A computation module 1211 processes the input data by using the target model/rule 1201. Finally, the I/O interface 1212 returns a processing result to the customer device 1240 and provides the processing result to the user. More deeply, the training device 1220 may generate corresponding target models/rules 1201 for different targets based on different data, to provide a better result for the user. The corresponding target model/rule 1201 may be used to implement the foregoing desired policy to provide a desired result for the user (e.g. DRL agent operator 410).

In a case shown in FIG. 12, the user may manually specify data to be input to the execution device 1210, for example, an operation in a screen provided by the I/O interface 1212. In another case, the customer device 1240 may automatically input data to the I/O interface 1212 and obtain a result. If the customer device 1240 automatically inputs data, authorization of the user needs to be obtained. The user can specify a corresponding permission in the customer device 1240. The user may view, in the customer device 1240, the result output by the execution device 1210. A specific presentation form may be display content, a voice, an action, and the like. In addition, the customer device 1240 may be used as a data collector to store collected data into the database 1230.

It should be noted that FIG. 12 is merely a schematic diagram of a system architecture according to an embodiment of the present disclosure. Position relationships between the device, the component, the module, and the like that are shown in FIG. 12 do not constitute any limitation. For example, in FIG. 12, the data storage system 1250 is an external memory relative to the execution device 1210. In another case, the data storage system 1250 may be located in the execution device 1210.

Figure 13:
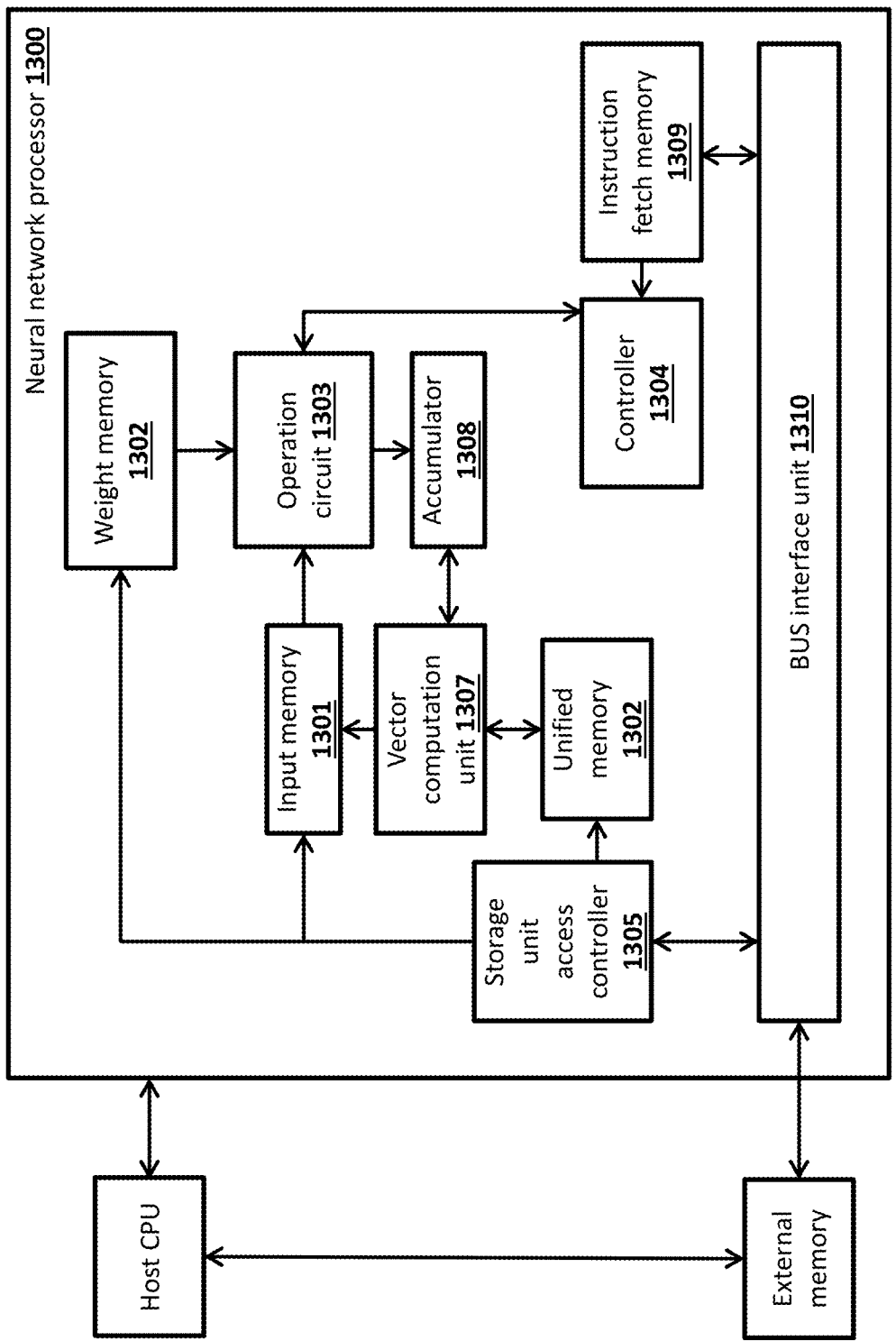
FIG. 13 is a structural hardware diagram of a chip according to an embodiment of the present disclosure.

FIG. 13 is a structural hardware diagram of a chip according to an embodiment of the present disclosure. The chip includes a neural network processor 1300. The chip may be provided in the execution device 1210 shown in FIG. 12, to perform computation for the computation module 1211. Alternatively, the chip may be provided in the training device 1220 shown in FIG. 12, to perform training and output the target model/rule 1201. In some embodiments, all the algorithms of layers (not shown in FIG. 6) of the recurrent neural network (RNN) 650 in FIG. 6 may be implemented in the chip shown in FIG. 13.

The neural network processor 1300 may be any processor that is applicable to massive exclusive OR operations, for example, a neural processing unit (NPU), a tensor processing unit (TPU), a graphics processing unit (GPU), or the like. The NPU is used as an example. The NPU may be mounted, as a coprocessor, to a host CPU and the host CPU allocates a task. A core part of the NPU is an operation circuit 1303. A controller 1304 controls the operation circuit 1303 to extract matrix data from a memory and perform a multiplication operation.

In some implementations, the operation circuit 1303 internally includes a plurality of processing units (process engine, PE). In some implementations, the operation circuit 1303 is a bi-dimensional systolic array. In addition, the operation circuit 1303 may be a uni-dimensional systolic array or another electronic circuit that can implement a mathematical operation such as multiplication and addition. In some implementations, the operation circuit 1303 is a general matrix processor.

For example, it is assumed that there are an input matrix A, a weight matrix B, and an output matrix C. The operation circuit obtains, from a weight memory 1302, data corresponding to the matrix B, and caches the data in each PE in the operation circuit. The operation circuit obtains data of the matrix A from an input memory 1301, and performs a matrix operation on the data of the matrix A and the data of the matrix B. An obtained partial or final matrix result is stored in an accumulator (accumulator) 1308.

A unified memory 1306 is configured to store input data and output data. Weight data is directly moved to the weight memory 1302 by using a storage unit access controller (e.g. direct memory access controller, DMAC) 1305. The input data is also moved to the unified memory 1306 by using the DMAC.

An interface unit (BIU) 1310 is configured to enable an AXI bus to interact with the DMAC and an instruction fetch memory (instruction fetch buffer) 1309. The BIU 1310 may be further configured to enable the instruction fetch memory 1309 to obtain an instruction from an external memory, and is further configured to enable the storage unit access controller 1305 to obtain, from the external memory, source data of the input matrix A or the weight matrix B.

The storage unit access controller (e.g., DMAC) 1305 is mainly configured to move input data from an external memory DDR to the unified memory 1306, or move the weight data to the weight memory 1302, or move the input data to the input memory 1301.

A vector computation unit 1307 includes a plurality of operation processing units. If needed, the vector computation unit 1307 performs further processing, for example, vector multiplication, vector addition, an exponent operation, a logarithm operation, or magnitude comparison, on an output from the operation circuit. The vector computation unit 1307 is mainly used for non-convolutional/FC-layer network computation in a neural network, for example, pooling (pooling), batch normalization (batch normalization), or local response normalization (local response normalization).

In some implementations, the vector computation unit 1307 can store, to the unified buffer 1306, a vector output through processing. For example, the vector computation unit 1307 may apply a nonlinear function to an output of the operation circuit 1303, for example, a vector of an accumulated value, to generate an activation value. In some implementations, the vector computation unit 1307 generates a normalized value, a combined value, or both a normalized value and a combined value. In some implementations, the vector output through processing (the vector processed by the vector computation unit 1307) may be used as activation input to the operation circuit 1303, for example, to be used in some layer(s) of the recurrent neural network in FIG. 17.

The instruction fetch memory (instruction fetch buffer) 1309 connected to the controller 1304 is configured to store an instruction used by the controller 1304. The unified memory 1306, the input memory 1301, the weight memory 1302, and the instruction fetch memory 1309 are all on-chip memories. The external memory is independent from the hardware architecture of the NPU.

Figure 17:
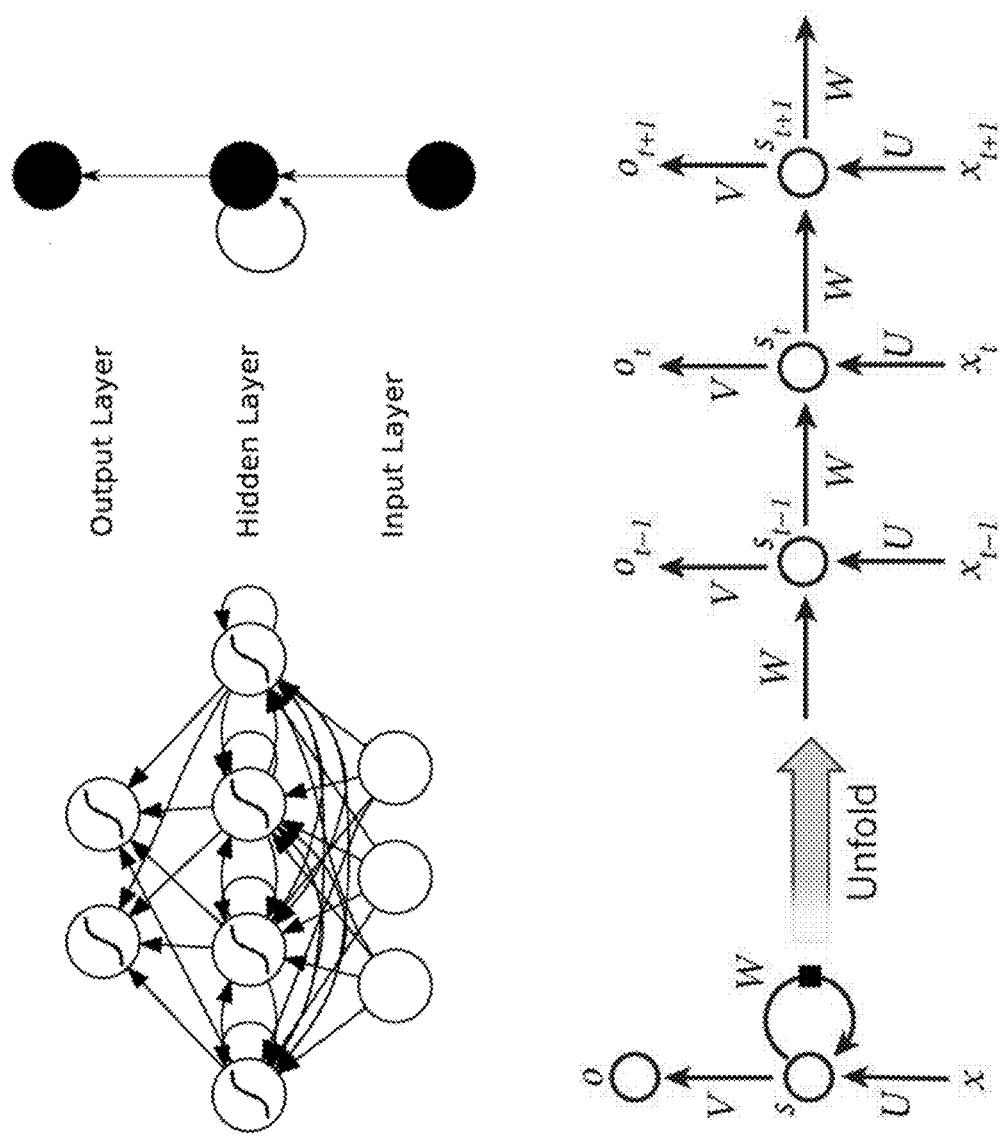
FIG. 17 is a schematic structural diagram of an RNN according to embodiments of the present disclosure.

Operations at the layers of the recurrent neural networks, for example RNN shown in FIG. 17 may be performed by the operation circuit 1303 or the vector computation unit 1307.

Figure 14:
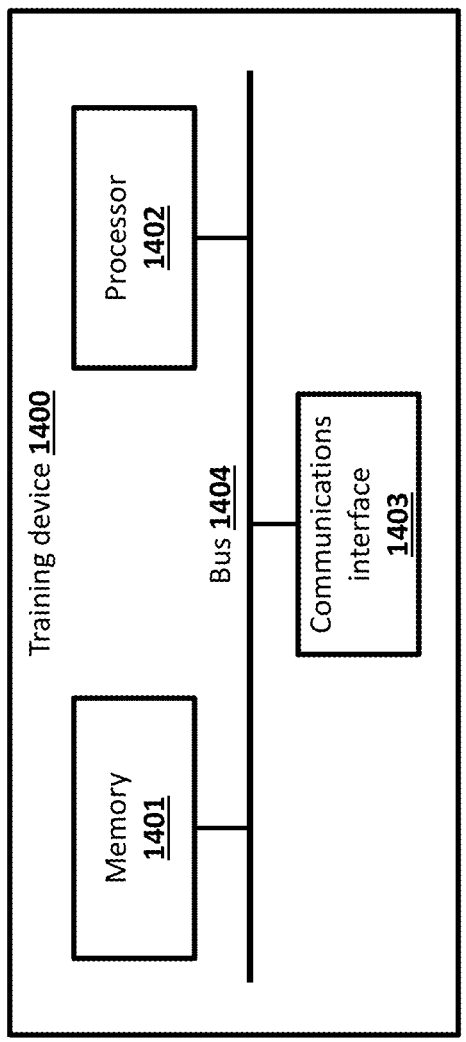
FIG. 14 illustrates a schematic diagram of a hardware structure of a training apparatus according to an embodiment of the present disclosure.

FIG. 14 is a schematic diagram of a hardware structure of a training apparatus according to an embodiment of the present disclosure. A training apparatus 1400 shown in FIG. 14 includes a memory 1401, a processor 1402, a communications interface 1403, and a bus 1404. A communication connection is implemented between the memory 1401, the processor 1402, and the communications interface 1403 by using the bus 1404. The apparatus 1400 may be specifically a computer device and may refer to the training device 1220.

The memory 1401 may be a read-only memory (ROM), a static storage device, a dynamic storage device, or a random access memory (RAM). The memory 1401 may store a program. The processor 1402 and the communications interface 1403 are configured to perform, when the program stored in the memory 1401 is executed by the processor 1402, steps of one or more embodiments described herein, for example, embodiments described in reference to FIGS. 3, 4 and 6 to 10.

The processor 1402 may be a general central processing unit (CPU), a microprocessor, an application-specific integrated circuit (ASIC), a graphics processing unit (GPU), or one or more integrated circuits. The processor 1402 may be configured to execute a related program to implement a function that needs to be performed by a unit in the training apparatus according to one or more embodiments described herein, for example, embodiments described in reference to FIGS. 3, 4 and 6 to 10.

In addition, the processor 1402 may be an integrated circuit chip with a signal processing capability. In an implementation process, steps of the training method according to this application may be performed by an integrated logical circuit in a form of hardware or by an instruction in a form of software in the processor 1402. In addition, the foregoing processor 1402 may be a general purpose processor, a digital signal processor (DSP), an application-specific integrated circuit (ASIC), a field programmable gate array (FPGA) or another programmable logic device, a discrete gate or a transistor logic device, or a discrete hardware assembly. The processor 1402 may implement or execute the methods, steps, and logical block diagrams that are disclosed in the embodiments of this application. The general purpose processor may be a microprocessor, or the processor may be any conventional processor or the like. The steps of the method disclosed with reference to the embodiments of this application may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 1401. The processor 1402 reads information from the memory 1401, and completes, by using hardware in the processor 1402, the functions that need to be performed by the units included in the training apparatus according to one or more embodiments described herein, for example, embodiments described in reference to FIGS. 3, 4 and 6 to 10.

The communications interface 1403 implements communication between the apparatus 1400 and another device or communications network by using a transceiver apparatus, for example, including but not limited to a transceiver. For example, training data (for example, secret operational key 340, secret operational key function 440, secret operational key 823k, secret function 833) may be obtained by using the communications interface 1403.

The bus 1404 may include a path that transfers information between all the components (for example, the memory 1401, the processor 1402, and the communications interface 1403) of the apparatus 1400.

Figure 15:
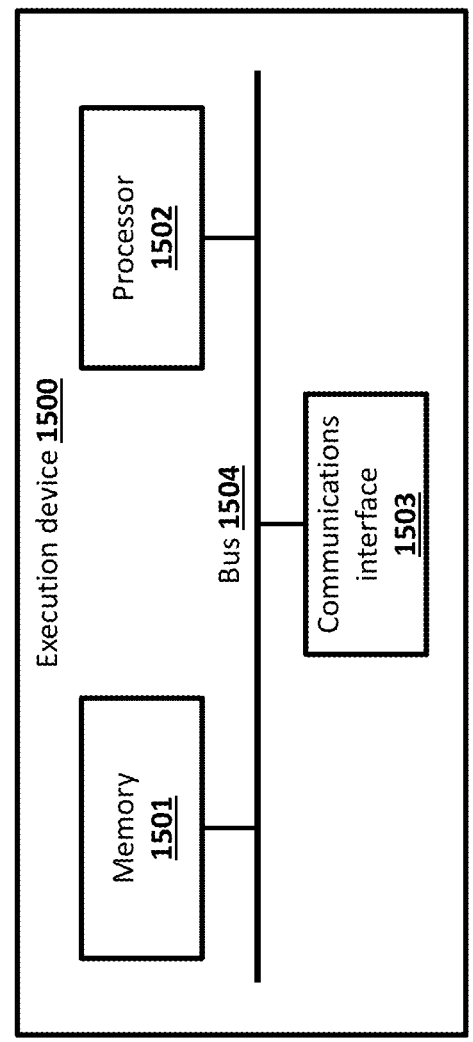
FIG. 15 illustrates a schematic diagram of a hardware structure of an execution apparatus according to an embodiment of the present disclosure.

FIG. 15 is a schematic diagram of a hardware structure of an execution apparatus according to an embodiment of the present disclosure. An execution apparatus 1500 shown in FIG. 15 includes a memory 1501, a processor 1502, a communications interface 1503, and a bus 1504. A communication connection is implemented between the memory 1501, the processor 1502, and the communications interface 1503 by using the bus 1504. The apparatus 1500 may be specifically a computer device or refer to the execution device 1210 or devices containing the DRL agents (e.g. DRL agent 420, 822, 832, 920, 1020).

The memory 1501 may be a read-only memory (ROM), a static storage device, a dynamic storage device, or a random access memory (RAM). The memory 1501 may store a program. The processor 1501 and the communications interface 1502 are configured to perform, when the program stored in the memory 1502 is executed by the processor 1503, steps of one or more embodiments described herein, for example, embodiments described in reference to FIGS. 3, 4 and 6 to 10.

The processor 1502 may be a general central processing unit (CPU), a microprocessor, an application-specific integrated circuit (ASIC), a graphics processing unit (GPU), or one or more integrated circuits. The processor 1502 may be configured to execute a related program to implement a function that needs to be performed by a unit in the execution apparatus according to one or more embodiments described herein, for example, embodiments described in reference to FIGS. 3, 4 and 6 to 10.

In addition, the processor 1502 may be an integrated circuit chip with a signal processing capability. In an implementation process, steps of one or more execution methods described in the present disclosure may be performed by an integrated logical circuit in a form of hardware or by an instruction in a form of software in the processor 1502. In addition, the foregoing processor 1502 may be a general purpose processor, a digital signal processor (DSP), an application-specific integrated circuit (ASIC), a field programmable gate array (FPGA) or another programmable logic device, a discrete gate or a transistor logic device, or a discrete hardware assembly. The foregoing processor 1502 may implement or execute the methods, steps, and logical block diagrams that are disclosed in the embodiments of this application. The general purpose processor may be a microprocessor, or the processor may be any conventional processor or the like. The steps of the method disclosed with reference to the embodiments of this application may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 1501. The processor 1502 reads information from the memory 1501, and completes, by using hardware in the processor 1502, the functions that need to be performed by the units included in the execution apparatus according to one or more embodiments described herein, for example, embodiments described in reference to FIGS. 3, 4 and 6 to 10.

The communications interface 1503 implements communication between the apparatus 1500 and another device or communications network by using a transceiver apparatus, for example, including but not limited to a transceiver. For example, training data to protect the DRL agent may be obtained by using the communications interface 1503.

The bus 1504 may include a path that transfers information between all the components (for example, the memory 1501, the processor 1502, and the communications interface 1503) of the apparatus 1500.

It should be noted that, although only the memory, the processor, and the communications interface are shown in the apparatuses 1400 and 1500 in FIG. 14 and FIG. 15, in a specific implementation process, a person skilled in the art should understand that the apparatuses 1400 and 1500 may further include other components that are necessary for implementing normal running. In addition, based on specific needs, a person skilled in the art should understand that the apparatuses 1400 and 1500 may further include hardware components that implement other additional functions. In addition, a person skilled in the art should understand that the apparatuses 1400 and 1500 may include only a component required for implementing the embodiments of the present invention, without a need to include all the components shown in FIG. 14 or FIG. 15.

It may be understood that the apparatus 1400 is equivalent to the training device 1220 in FIG. 12, and the apparatus 1500 is equivalent to the execution device 1210 in FIG. 12. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 16:
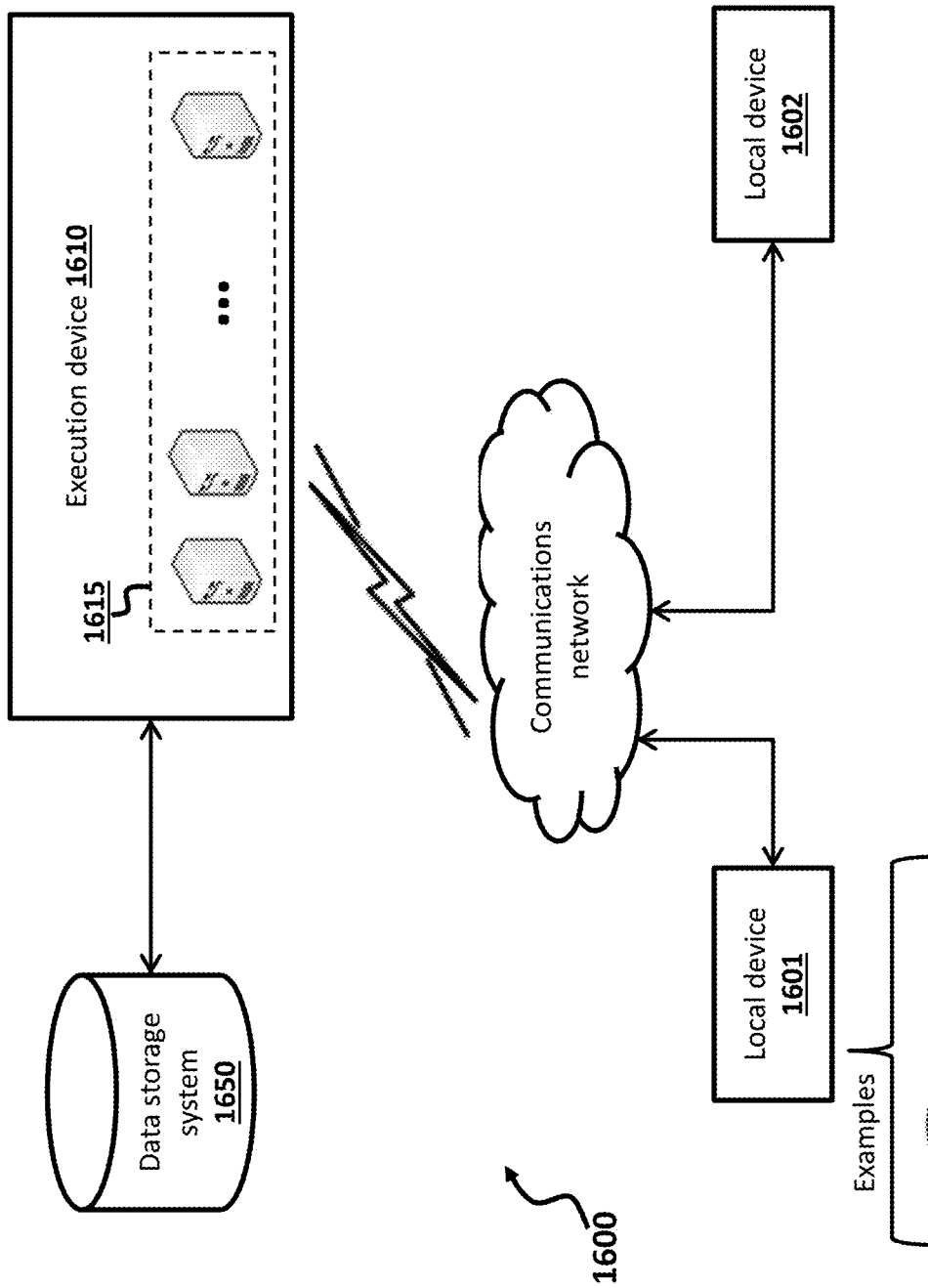
FIG. 16 illustrates a system architecture according to an embodiment of the present disclosure.

FIG. 16 illustrates a system architecture 1600 according to an embodiment of the present disclosure. Referring to FIG. 16, an embodiment of the present invention provides a system architecture 1600. An execution device 1610 is implemented by one or more servers 1615, and optionally, supported by another computation device, for example, a data memory, a router, a load balancer, or another device. The execution device 1610 may be arranged in a physical station or be distributed to a plurality of physical stations. The execution device 1610 may use data in a data storage system 1650 or invoke program code in a data storage system 1650, to implement steps of the method disclosed with reference to the embodiments of this application Users may operate respective user equipment (such as a local device 1601 and another local device 1602) of the users to interact with the execution device 1610. Each local device may indicate any computation device, for example, a personal computer, a computer work station, a smartphone, a tablet computer, a smart camera, a smart car, or another type of cellular phone, a media consumption device, a wearable device, a set-top box, or a game console.

The local device of each user may interact with the execution device 1610 by using a communications network of any communications mechanism/communications standard. The communications network may be a wide area network, a local area network, a point-to-point connected network, or any combination thereof.

In another implementation, one or more aspects of the execution devices 1610 may be implemented by each local device. For example, the local device 1601 may provide local data for the execution device 1610 or feed back a computation result.

It should be noted that all functionalities of the execution device 1610 may be implemented by the local device. For example, the local device 1601 implements a function of the execution device 1610 and provides a service for a user of the local device 1601, or provides a service for a user of the local device 1602.

FIG. 17 is a schematic structural diagram of an RNN, such as a recurrent neural network (RNN) 650 in FIG. 6, according to embodiments of the present disclosure. RNNs are to process sequence data. In a conventional neural network model, a full connection is implemented between layers, from an input layer to a hidden layer and then to an output layer, and nodes between layers are disconnected. However, such a common neural network is incapable of resolving many problems. For example, to predict a word in a sentence, a previous word is usually needed, because a word is dependent on its previous word in a sentence. RNNs are referred to as recurrent neural networks, because a current output of a sequence is also related to a previous output. In a specific representation form, a network memorizes previous information and applies the previous information to computation of the current output. In other words, the nodes between the hidden layers are no longer disconnected, but are connected, and an input to a hidden layer not only includes an output from the input layer, but also includes an output from the hidden layer at a previous moment. In theory, the RNNs can process sequence data of any length.

Training of the RNN is the same as training of a conventional ANN (artificial neural network). The BP error back propagation algorithm is also used. However, there is a difference. If the RNNs are unfolded, parameters W, U, and V are shared. However, the parameters are not shared in a conventional neural network. In addition, in a gradient descent algorithm, an output of each step not only depends on a network of a current step, but also depends on network states of several previous steps. For example, when t is 4, the propagation needs to be performed backward for three additional steps, and respective gradients need to be added to each of the three steps. The learning algorithm is referred to as back propagation through time (back propagation through time, BPTT).

The recurrent neural network is needed in spite of the existing artificial neural network and the existing convolutional neural network. A premise of the convolutional neural network and a premise of the artificial neural network are both as follows: Elements are mutually independent, and an input is independent from an output. However, in the real world, many elements are mutually connected, and inputs are often affected by outputs. Therefore, to overcome the gap between the real world and the premise of existing convolutional neural network and artificial neural network, the present recurrent neural network emerges. The essence of the recurrent neural network is that the recurrent neural network has a memorizing capability, just like a human being does. In this way, an output of the recurrent neural network depends on a current input and a memory.

Referring to FIG. 17 illustrating a structure of an RNN, each circle may be considered as one cell, and each cell does a same thing. Therefore, the diagram may be folded into a half figure on the left. In a word, the RNN is obtained through repeated use of one cell structure.

The RNN is a sequence-to-sequence model. It is assumed that $x_{t-1}$, $x_t$, and $x_{t+1}$ are inputs: "United States of". In this case, $o_{t-1}$ and $o_t$ are corresponding to "States" and "of" respectively. Upon prediction of the next word, there is a relatively high probability that $o_{t+1}$ is "America". Therefore, the following can be defined:

$X_t$ indicates an input at a t moment, $o_t$ indicates an output at the t moment, and $S_t$ indicates a memory at the t moment. An output at a current moment is determined based on an output at the current moment and a memory. A neural network is best at integrating a large amount of content by using a series of parameters and then learning the parameters. In this way, a base of the RNN is defined as follows:

$$S_t = f(U*X_t + W*S_{t-1})$$

The f( ) function is an activation function in the neural network. Since the RNN is capable of memorizing, certainly, only important information is memorized, other unimportant information can be surely forgotten. For that, an activation function is needed for filtering information in the neural network. Therefore, an activation function is applied herein, to make a non-linear mapping to filter information. This activation function may be tan h or may be another function.

An idea of the RNN is to make a prediction based on the memory $S_t$ at the current moment. When a next word for "United States of" is predicted, it is apparent that the next word would be "America". In practice, such predictions will be made using softmax to ensure the next word is most appropriate and probable word to be placed. However, it should be noted that as a matrix cannot be directly used to make such prediction, a weight matrix V needs to be utilized when making the prediction. The weight matrix is indicated by the following formula:

$$o_t = \text{softmax}(VS_t), \text{ where } o_t \text{ indicates the output at the } t \text{ moment.}$$

1. $S_t$ may be considered as a hidden state in which information at a previous time point is captured.
2. $o_t$ is obtained based on all memories at current time and previous time.
3. It is a pity that not information at all previous time points can be captured in $S_t$.
4. Like a convolutional neural network, in the network herein, all cells share a group of parameters (U, V, and W). This can greatly reduce a computation amount.
5. $o_t$ is nonexistent in a large quantity of cases, because only a final result is concerned in a large quantity of tasks, such as a text sentiment analysis.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for preventing unauthorized use of a deep reinforcement learning (DRL) agent, the method comprising:
    training the DRL agent to operate based on a desired policy when a secret operational key is provided to the DRL agent, the secret operational key being exclusively available to an authorized entity;
    training the DRL agent to operate based on an undesired policy when the secret operational key is missing;
    upon detection of the secret operational key, operating the DRL agent based on the desired policy when authorized use of the DRL agent is solely based on detection of the secret operational key;
    upon non-detection of the secret operational key, operating the DRL agent based on the undesired policy when authorized use of the DRL agent is solely based on detection of the secret operational key;
    appending a new state space to an original state space, the union of the new state space and the original state space representing a set of states for the DRL agent;
    selecting one or more elements from the new state space; and
    determining the secret operational key based on the selected one or more elements.

2. The method of claim 1, wherein the secret operational key is designated as a secret function of a state or combination of states in the original state space, the secret function exclusively known to an owner of the DRL agent.

3. A method for preventing unauthorized use of a deep reinforcement learning (DRL) agent, the method comprising:
    training the DRL agent to operate based on a desired policy when a secret operational key is provided to the DRL agent, the secret operational key being exclusively available to an authorized entity;
    training the DRL agent to operate based on an undesired policy when the secret operational key is missing;
    upon detection of the secret operational key, operating the DRL agent based on the desired policy when authorized use of the DRL agent is solely based on detection of the secret operational key; and
    upon non-detection of the secret operational key, operating the DRL agent based on the undesired policy when authorized use of the DRL agent is solely based on detection of the secret operational key;
wherein the secret operational key is a temporal sequence derived from a state transition space for a trajectory for a behaviour of the DRL agent over one or more discrete time steps.

4. The method according to claim 3, further comprising:
    training the DRL agent to operate based on a second desired policy when a second secret operational key is provided to the DRL agent, the second secret operational key being exclusively available to the authorized entity or another authorized entity;
    upon detection of the second secret operational key, operating the DRL agent based on the second desired policy; and
    upon non-detection of the second secret operational key, operating the DRL agent based on the undesired policy when authorized use of the DRL agent is solely based on detection of the second secret operational key.

5. The method according to claim 3, wherein training the DRL agent based on the desired policy further comprises training the DRL agent to operate based on the desired policy when both the secret operational key and a second secret operational key are provided to the DRL agent, the second secret operational key being exclusively available to the authorized entity;
    wherein training the DRL agent to operate based on the undesired policy further comprises training the DRL agent to operate based on the undesired policy when one or more of the secret operational key and the second secret operational key are missing;
    upon detection of the secret operational key and the second secret operational key, operating the DRL agent based on the desired policy when authorized use of the DRL agent is solely based on detection of the secret operational key and the second secret operational key; and
    upon non-detection of one or more of the secret operational key and the second secret operational key, operating the DRL agent based on the undesired policy.

6. The method of claim 3, wherein the secret operational key is provided through a physical object.

7. The method of claim 3, wherein the secret operational key is provided by a function embedded in a system operatively associated with the DRL agent.

8. The method of claim 3, wherein an operational level of the DRL agent is dependent upon which secret operational key is provided to the DRL agent.

9. A system for preventing unauthorized use of a deep reinforcement learning (DRL) agent comprising:
    a DRL agent training device configured for:
        training the DRL agent to operate based on a desired policy when a secret operational key is provided to the DRL agent, the secret operational key being exclusively available to an authorized entity;
        training the DRL agent to operate based on an undesired policy when the secret operational key is missing; and
    a DRL agent execution device configured for:
        upon detection of the secret operational key, operating the DRL agent based on the desired policy when authorized use of the DRL agent is solely based on detection of the secret operational key,
        upon non-detection of the secret operational key, operating the DRL agent based on the undesired policy when authorized use of the DRL agent is solely based on detection of the secret operational key;
    appending a new state space to an original state space, the new state space and the original state space representing a set of states for the DRL agent;
    selecting one or more elements from the new state space; and
    determining the secret operational key based on the selected one or more elements.

10. The system according to claim 9, wherein the secret operational key is designated as a secret function of a state or combination of states in the original state space, the secret function exclusively known to an owner of the DRL agent.

11. A system for preventing unauthorized use of a deep reinforcement learning (DRL) agent comprising:
a DRL agent training device configured for:
training the DRL agent to operate based on a desired policy when a secret operational key is provided to the DRL agent, the secret operational key being exclusively available to an authorized entity;
training the DRL agent to operate based on an undesired policy when the secret operational key is missing; and
a DRL agent execution device configured for:
upon detection of the secret operational key, operating the DRL agent based on the desired policy when authorized use of the DRL agent is solely based on detection of the secret operational key, and
upon non-detection of the secret operational key, operating the DRL agent based on the undesired policy when authorized use of the DRL agent is solely based on detection of the secret operational key;
wherein the secret operational key is a temporal sequence derived from a state transition space for a trajectory for a behaviour of the DRL agent over one or more discrete time steps.

12. The system according to claim 11, wherein the DRL agent training unit is further configured for:
training the DRL agent to operate based on a second desired policy when a second secret operational key is provided to the DRL agent, the second secret operational key being exclusively available to the authorized entity or another authorized entity;
wherein the DRL agent execution device is further configured for:
upon detection of the second secret operational key, operating the DRL agent based on the second desired policy; and
upon non-detection of the second secret operational key, operating the DRL agent based on the undesired policy when authorized use of the DRL agent is solely based on detection of the second secret operational key.

13. The system according to claim 11, wherein training the DRL agent based on the desired policy further comprises training the DRL agent to operate based on the desired policy when both the secret operational key and a second secret operational key are provided to the DRL agent, the second secret operational key being exclusively available to the authorized entity;
wherein training the DRL agent to operate based on the undesired policy further comprises training the DRL agent to operate based on the undesired policy when one or more of the secret operational key and the second secret operational key are missing;
wherein the DRL agent execution device is further configured for:
upon detection of the secret operational key and the second secret operational key, operating the DRL agent based on the desired policy when authorized use of the DRL agent is solely based on detection of the secret operational key and the second secret operational key; and
upon non-detection of one or more of the secret operational key and the second secret operational key, operating the DRL agent based on the undesired policy.

14. The system according to claim 11, wherein the secret operational key is provided through a physical object.

15. The system according to claim 11, wherein the secret operational key is provided by a function embedded in a system operatively associated with the DRL agent.

16. The system according to claim 11, wherein an operational level of the DRL agent is dependent upon which secret operational key is provided to the DRL agent.

17. A non-transitory computer program product for preventing unauthorized use of a deep reinforcement learning (DRL) agent, the DRL agent trained to operate based on a desired policy when a secret operational key is provided to the DRL agent and operate based on an undesired policy when the secret operational key is missing, the secret operational key being exclusively available to an authorized entity, the computer program product having a computer program stored thereon, containing computer-readable program instructions that, when executed by a processing unit in a controller, causes the controller to perform actions including:
upon detection of the secret operational key, operating the DRL agent based on the desired policy when authorized use of the DRL agent is solely based on detection of the secret operational key; and
upon non-detection of the secret operational key, operating the DRL agent based on the undesired policy when authorized use of the DRL agent is solely based on detection of the secret operational key;
wherein the secret operational key is a temporal sequence derived from a state transition space for a trajectory for a behaviour of the DRL agent over one or more discrete time steps.

18. A non-transitory computer program product for preventing unauthorized use of a deep reinforcement learning (DRL) agent, the DRL agent trained to operate based on a desired policy when a secret operational key is provided to the DRL agent and operate based on an undesired policy when the secret operational key is missing, the secret operational key being exclusively available to an authorized entity, the computer program product having a computer program stored thereon, containing computer-readable program instructions that, when executed by a processing unit in a controller, causes the controller to perform actions including:
upon detection of the secret operational key, operating the DRL agent based on the desired policy when authorized use of the DRL agent is solely based on detection of the secret operational key;
upon non-detection of the secret operational key, operating the DRL agent based on the undesired policy when authorized use of the DRL agent is solely based on detection of the secret operational key;
append a new state space to an original state space, the new state space and the original state space representing a set of states for the DRL agent;
select one or more elements from the new state space; and
determine the secret operational key based on the selected one or more elements.

* * * * *